US009469037B2

(12) United States Patent
Matthews et al.

(10) Patent No.: US 9,469,037 B2
(45) Date of Patent: *Oct. 18, 2016

(54) ROBOTIC TESTING DEVICE AND METHOD FOR MORE CLOSELY EMULATING HUMAN MOVEMENTS DURING ROBOTIC TESTING OF MOBILE DEVICES

(71) Applicant: APKUDO, LLC, Baltimore, MD (US)

(72) Inventors: Josh Matthews, Baltimore, MD (US); Ronak Shah, Baltimore, MD (US); David Teitelbaum, Havre de Grace, MD (US); Kevin King, Baltimore, MD (US); Daniel Joyce, Ellicott City, MD (US); David Perenic, Baltimore, MD (US)

(73) Assignee: APKUDO, LLC, Baltimore, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/018,827

(22) Filed: Feb. 8, 2016

(65) Prior Publication Data
US 2016/0167238 A1 Jun. 16, 2016

Related U.S. Application Data

(63) Continuation of application No. 14/567,437, filed on Dec. 11, 2014, now Pat. No. 9,283,672.

(51) Int. Cl.
*G06F 3/041* (2006.01)
*B25J 19/02* (2006.01)
(Continued)

(52) U.S. Cl.
CPC ............. *B25J 19/023* (2013.01); *B25J 9/0084* (2013.01); *B25J 9/0096* (2013.01); *G01M 99/008* (2013.01); *Y10S 901/06* (2013.01); *Y10S 901/30* (2013.01); *Y10S 901/47* (2013.01)

(58) Field of Classification Search
CPC .... B25J 9/0096; B25J 9/0084; B25J 19/023; Y10S 901/06; Y10S 901/30; Y10S 901/47; G01M 99/008
See application file for complete search history.

(56) References Cited

U.S. PATENT DOCUMENTS

| | | | |
|---|---|---|---|
| 6,044,398 A | 3/2000 | Marullo et al. | 709/219 |
| 6,618,045 B1 | 9/2003 | Lin | 345/207 |

(Continued)

FOREIGN PATENT DOCUMENTS

| | | |
|---|---|---|
| CN | 102110053 A | 6/2011 |
| CN | 102141960 A | 8/2011 |

(Continued)

OTHER PUBLICATIONS

Optofidelity Touch and Test, published May 4, 1012, available at https://www.youtube.com/watch?v=7RrimeshYSc.*

(Continued)

*Primary Examiner* — Michael McCullough
*Assistant Examiner* — Mark Hageman
(74) *Attorney, Agent, or Firm* — Pillsbury Winthrop Shaw Pittman LLP

(57) ABSTRACT

A robotic testing device is provided for more closely emulating human movements during robotic testing of mobile devices by using multiple robotic implements to interact with a mobile device, and by facilitating movement of the mobile device during testing. The robotic testing device may facilitate use of multiple robotic implements configured to interact with a mobile device during testing of the mobile device. One or more of the multiple robotic implements may be configured to move simultaneously, in succession, separately, and/or otherwise interact with a mobile device during performance of a test command on the mobile device. Further, a holder of the mobile device may be configured to move during performance of a test command on the mobile device.

19 Claims, 10 Drawing Sheets

(51) Int. Cl.
*B25J 9/00* (2006.01)
*G01M 99/00* (2011.01)

(56) References Cited

U.S. PATENT DOCUMENTS

| | | |
|---|---|---|
| 6,745,385 B1 | 6/2004 | Lupu et al. .................. 717/163 |
| 7,343,390 B2 | 3/2008 | Cohen et al. ................. 709/203 |
| 7,388,977 B2 | 6/2008 | Wang et al. .................. 382/141 |
| 7,483,984 B1 | 1/2009 | Jonker et al. ................. 709/226 |
| 7,769,009 B1 | 8/2010 | Katzer et al. ................. 370/390 |
| 8,271,608 B2 | 9/2012 | Mahaffey et al. ............. 709/217 |
| 8,296,445 B1 | 10/2012 | Hackborn et al. ............. 709/228 |
| 8,971,821 B2 | 3/2015 | Schlub et al. ................. 455/67.12 |
| 2003/0145317 A1 | 7/2003 | Chamberlain ................. 717/177 |
| 2004/0261248 A1 | 12/2004 | Hwang .......................... 29/559 |
| 2006/0038581 A1 | 2/2006 | Kanai ........................... 324/770 |
| 2006/0139269 A1 | 6/2006 | Takeshita et al. ............. 345/87 |
| 2006/0174162 A1 | 8/2006 | Varadarajan et al. ......... 714/38 |
| 2007/0186250 A1 | 8/2007 | Carey ........................... 725/62 |
| 2007/0205751 A1 | 9/2007 | Suzuki et al. ............. 324/158.1 |
| 2007/0256114 A1 | 11/2007 | Johnson et al. .............. 725/139 |
| 2008/0013825 A1 | 1/2008 | Nagatsuka et al. ........... 382/153 |
| 2008/0274716 A1 | 11/2008 | Fok et al. ..................... 455/410 |
| 2008/0316217 A1 | 12/2008 | Khan ............................ 345/522 |
| 2008/0316368 A1 | 12/2008 | Fritsch et al. ................. 348/722 |
| 2009/0007074 A1 | 1/2009 | Campion et al. .............. 717/124 |
| 2009/0031015 A1 | 1/2009 | Morgan et al. ................ 709/223 |
| 2009/0124250 A1 | 5/2009 | Topaltzas et al. ............. 455/423 |
| 2009/0138579 A1 | 5/2009 | Jung ............................. 709/221 |
| 2009/0203368 A1 | 8/2009 | Marsyla et al. ............... 455/418 |
| 2009/0249301 A1 | 10/2009 | Kalla et al. ................... 717/127 |
| 2009/0265035 A1 | 10/2009 | Jenkinson et al. ............ 700/259 |
| 2009/0307531 A1 | 12/2009 | Karthikeyan et al. .......... 714/38 |
| 2009/0312009 A1 | 12/2009 | Fishel ........................... 455/425 |
| 2010/0080143 A1 | 4/2010 | Topaltzas et al. ............. 370/254 |
| 2010/0088423 A1 | 4/2010 | Mazzagatte et al. ......... 709/229 |
| 2010/0198402 A1 | 8/2010 | Greer et al. .................. 700/247 |
| 2010/0231738 A1 | 9/2010 | Border et al. .............. 348/222.1 |
| 2011/0080940 A1 | 4/2011 | Bocharov et al. ........ 375/240.01 |
| 2011/0087924 A1 | 4/2011 | Kandula et al. ................ 714/26 |
| 2011/0113287 A1 | 5/2011 | Gururaj .......................... 714/37 |
| 2011/0263243 A1 | 10/2011 | Topaltzas et al. ............. 455/423 |
| 2011/0288964 A1 | 11/2011 | Linder et al. ................. 705/27.1 |
| 2011/0296009 A1 | 12/2011 | Baranov et al. ............... 709/224 |
| 2011/0302454 A1 | 12/2011 | Prophete et al. .............. 714/38.1 |
| 2011/0304634 A1 | 12/2011 | Urbach ......................... 345/501 |
| 2011/0310041 A1 | 12/2011 | Williams et al. .............. 345/173 |
| 2011/0320879 A1 | 12/2011 | Singh et al. ................... 714/38.1 |
| 2012/0015723 A1 | 1/2012 | Lai ............................... 463/31 |
| 2012/0070090 A1 | 3/2012 | Chang et al. ................. 382/218 |
| 2012/0146956 A1 | 6/2012 | Jenkinson ..................... 345/178 |
| 2012/0155292 A1 | 6/2012 | Zazula et al. ................. 370/252 |
| 2012/0188176 A1 | 7/2012 | Uzelac et al. ................. 345/173 |
| 2012/0191394 A1 | 7/2012 | Uzelac et al. ................. 702/79 |
| 2012/0198279 A1 | 8/2012 | Schroeder ..................... 714/32 |
| 2012/0210242 A1 | 8/2012 | Burckart et al. .............. 715/744 |
| 2012/0221570 A1 | 8/2012 | Kalavade ...................... 707/736 |
| 2012/0221893 A1 | 8/2012 | Bai et al. ...................... 714/27 |
| 2012/0231785 A1 | 9/2012 | Poon et al. ................... 455/423 |
| 2012/0245918 A1 | 9/2012 | Overton et al. ............... 703/27 |
| 2012/0246515 A1 | 9/2012 | Lusenhop et al. ............ 714/32 |
| 2012/0254917 A1 | 10/2012 | Burkitt et al. ................ 725/40 |
| 2012/0266142 A1 | 10/2012 | Bokhari ....................... 717/127 |
| 2012/0280934 A1 | 11/2012 | Ha et al. ...................... 345/174 |
| 2012/0311569 A1 | 12/2012 | Shah ............................ 718/1 |
| 2013/0002862 A1 | 1/2013 | Waring et al. ............... 348/143 |
| 2013/0132616 A1 | 5/2013 | Worthington et al. ........ 710/18 |
| 2013/0197862 A1 | 8/2013 | Uzelac et al. ................ 702/186 |
| 2013/0200917 A1 | 8/2013 | Panagas ................... 324/757.01 |
| 2014/0152584 A1 | 6/2014 | Matthews et al. ............ 345/173 |
| 2014/0156783 A1 | 6/2014 | Matthews et al. ............ 709/217 |
| 2014/0281714 A1 | 9/2014 | Matthews et al. ............ 714/27 |

FOREIGN PATENT DOCUMENTS

| | | |
|---|---|---|
| EP | 2 369 481 | 9/2011 |
| EP | 2 492 814 | 8/2012 |
| EP | 2 515 526 | 10/2012 |
| JP | 2008-244688 | 10/2008 |
| WO | WO 2011/128514 | 10/2011 |
| WO | WO 2014/150306 | 9/2014 |

OTHER PUBLICATIONS

Optofidelity Touch and Test Video, May 4, 2012, available at https://www.youtube.com/watch?v=7RrimeshYSc.*

"Monkeyrunner", A Simple monkeyrunner Program, The monkeyrunner API, Running monkeyrunner, monkeyrunner Built-in Help, and Extending monkeyrunner with Plugins, [no date], 6 pages.

"Testdroid Recorder 2.0.9", Testing, Tools, Application Development Frameworks, and Mobile and Device Development, [no date], 3 pages.

"Metrico Wireless", printed from http://www.metricowireless.com, copyright 2003-2012, printed Nov. 7, 2012, 6 pages.

"Crittercism", printed from http://www.crittercism.com, printed Nov. 7, 2012, 9 pages.

"OpenSignal—Crowdsourced Coverage Maps—About Us", printed from http://opensignal.com/about.php, copyright 2012, printed Nov. 7, 2012, 1 page.

"Savage Minds", printed from http://www.savageminds.com, copyright 2011, printed Nov. 7, 2012, 19 pages.

Optofidelity Touch Panel Performance Test Systems Brochure, dated Aug. 2013 available at http://www.optofidelity.com/wp-content/uploads/2013/09/0F_TPPT_general.pdf.

Optofidelity Test Automation Product Portfolio Brochure, dated May 2014 available at http://www.optofidelity.com/wp-content/uploads/2014/07/0F_ProductPortfolio_2014_En.pdf.

Video of Optofidelity Touch Panel Performance Tester, dated Oct. 15, 2012 available at https://www.youtube.com/watch?v=q_sxn1hZu78.

Optofidelity Watchdog Brochure, dated Oct. 2013 available at http://www.optofidelity.com/wp-content/uploads/2013/11/OF_WatchDog_EN_www.pdf.

Optofidelity Measurement Services Brochure, dated Oct. 2013 available at http://www.optofidelity.com/wp-content/uploads/2013/09/0F_MeasurementReport.pdf.

* cited by examiner

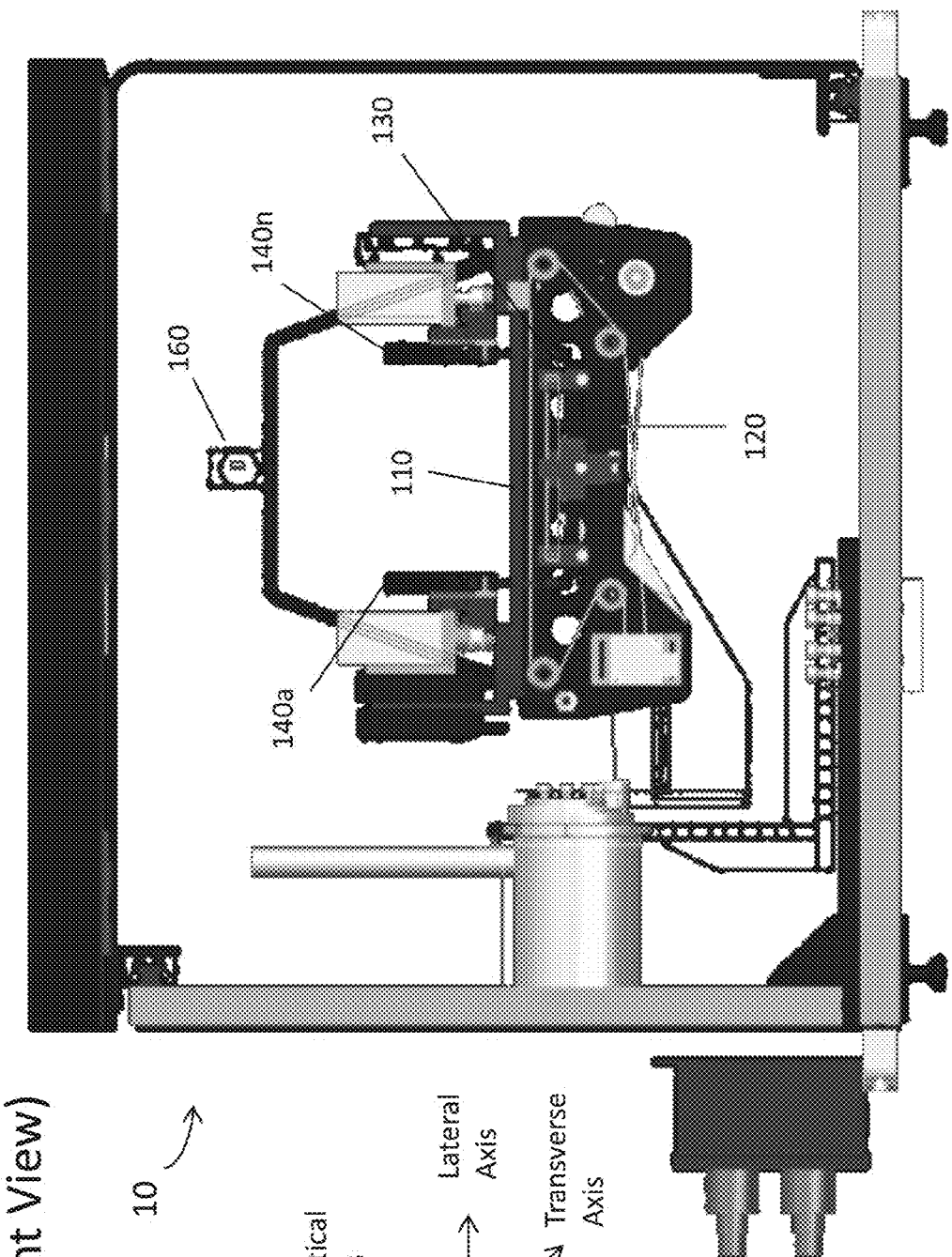

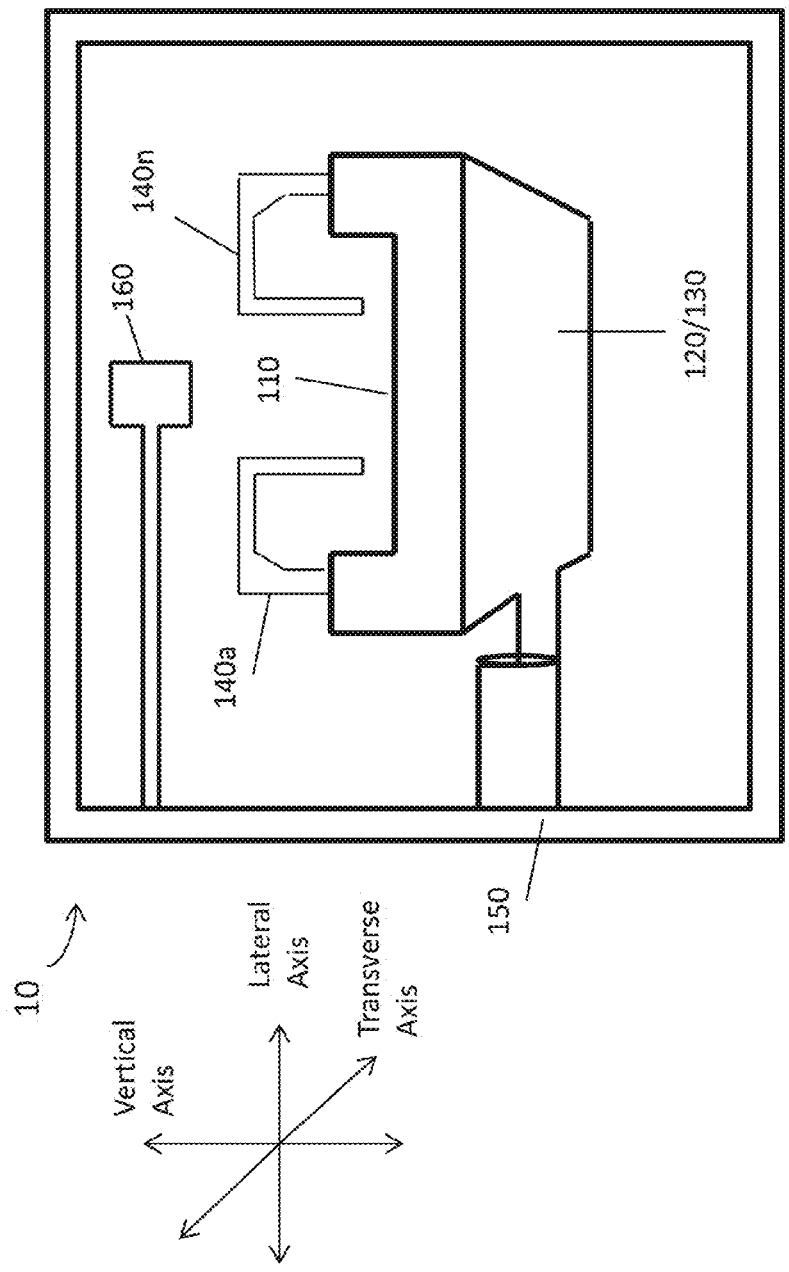

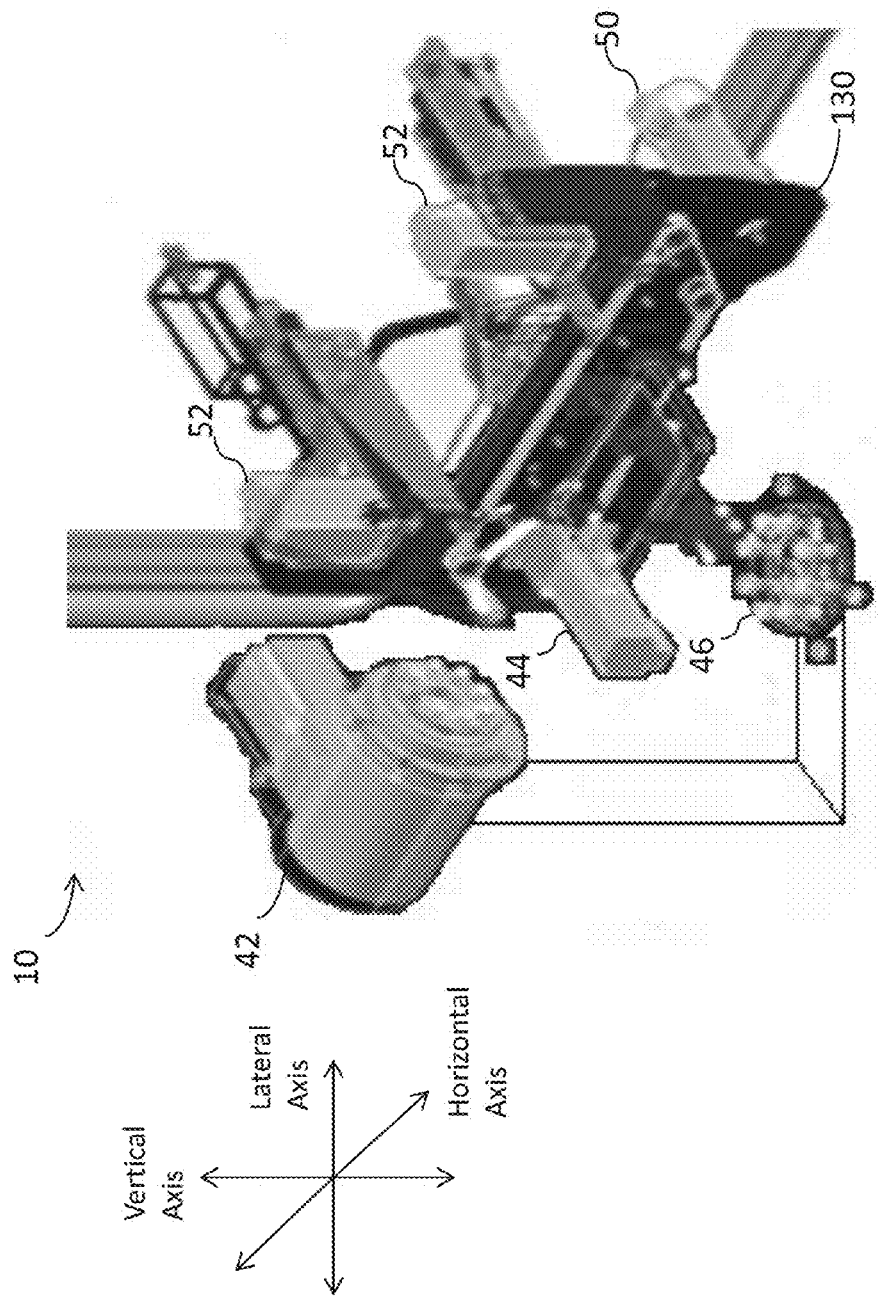

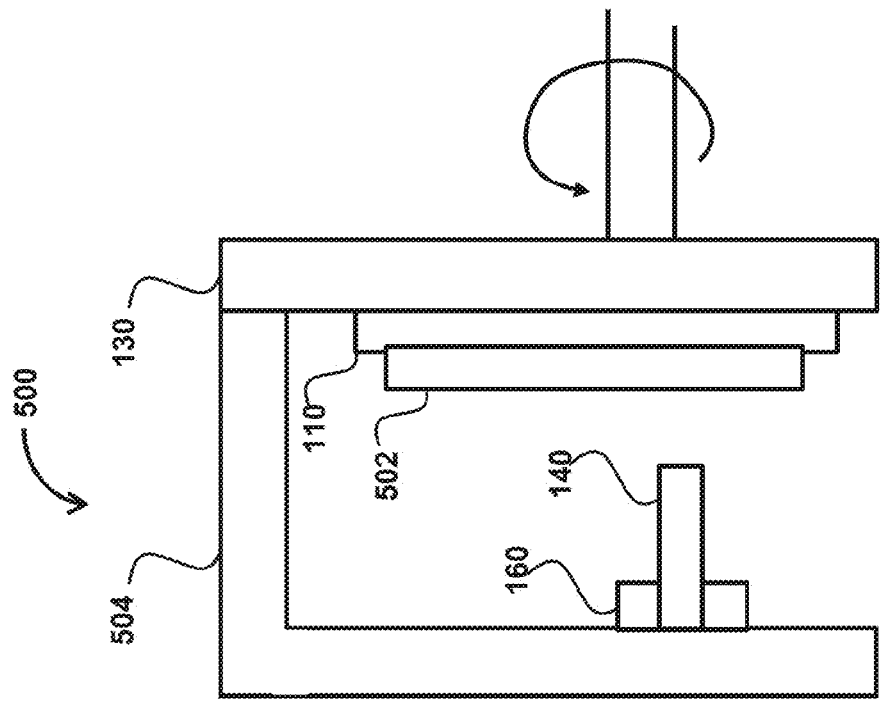
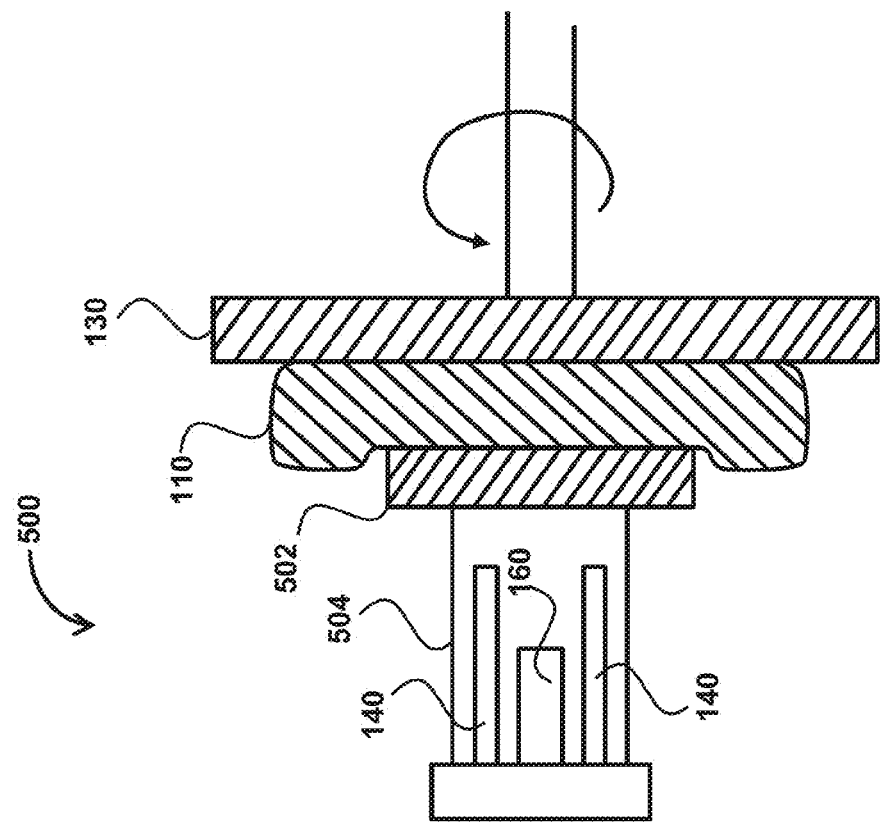

ROBOTIC TESTING DEVICE AND METHOD FOR MORE CLOSELY EMULATING HUMAN MOVEMENTS DURING ROBOTIC TESTING OF MOBILE DEVICES

CROSS-REFERENCE TO RELATED APPLICATION

This present application is a continuation of U.S. patent application Ser. No. 14/567,437, filed Dec. 11, 2014, which is hereby incorporated by reference herein in its entirety.

FIELD OF THE INVENTION

The invention relates to a robotic testing device and method for more closely emulating human movements during robotic testing of mobile devices by using multiple robotic implements to interact with a mobile device, and by facilitating movement of the mobile device during testing.

BACKGROUND OF THE INVENTION

Mobile devices are often tested to measure a user experience of the device. Mobile device manufacturers may wish to objectively measure user experience of the manufactured mobile devices. Additionally, an application developer may wish to objectively measure user experience of a test application using a selection of mobile devices. One or more sets of mobile devices may be chosen for testing. Robotic testing devices perform testing of various mobile devices to objectively measure user experience of the mobile devices. The results of a test may be recorded for later analysis.

Testing may be used to generally measure the user experience of a mobile device, but can also be used to address related problems. For example, when mobile devices are produced by different manufacturers, in many cases according to their own specification, the problem of fragmentation may occur. Fragmentation may occur when a given function or feature intended to operate in the same way, regardless of which mobile device is used, operates differently in different mobile devices. Such differences can, and typically do, result in various adverse effects, such as different user experiences, errors ("bugs") in some devices but not others, and/or other problems that can arise depending on the mobile device being used.

Testing may help mitigate the problem of fragmentation (as well as more generally measure user experiences), but can be a manually intensive process when performed by human operators and have deficiencies when automatically tested by robotic testing devices. For example, conventional robotic testing devices typically test a mobile device by securing the mobile device in a holder and using only a single type of robotic implement (e.g., a robotic finger) at a time during testing. Generally, a holder of a conventional robotic testing device secures the mobile device in a stationary position during testing, although some conventional robotic testing devices may re-position a mobile device between tests.

Conventional robotic testing devices suffer from these and other drawbacks.

BRIEF DESCRIPTION OF THE DRAWINGS

FIG. 2 illustrates an exemplary diagram of a front view of a robotic testing device, according to an aspect of the invention.

FIG. 3 illustrates an exemplary diagram of a front view of a robotic testing device, according to an aspect of the invention.

FIG. 4 illustrates an exemplary diagram of an isometric view of a robotic testing device, according to an aspect of the invention.

FIG. 5A illustrates a mobile device testing structure of a robotic testing device that rotatably secures a mobile device in a landscape orientation, according to an implementation of the invention.

FIG. 5B illustrates a mobile device testing structure of robotic testing device that rotatably secures a mobile device in a portrait orientation, according to an implementation of the invention.

DETAILED DESCRIPTION

Figure 1:
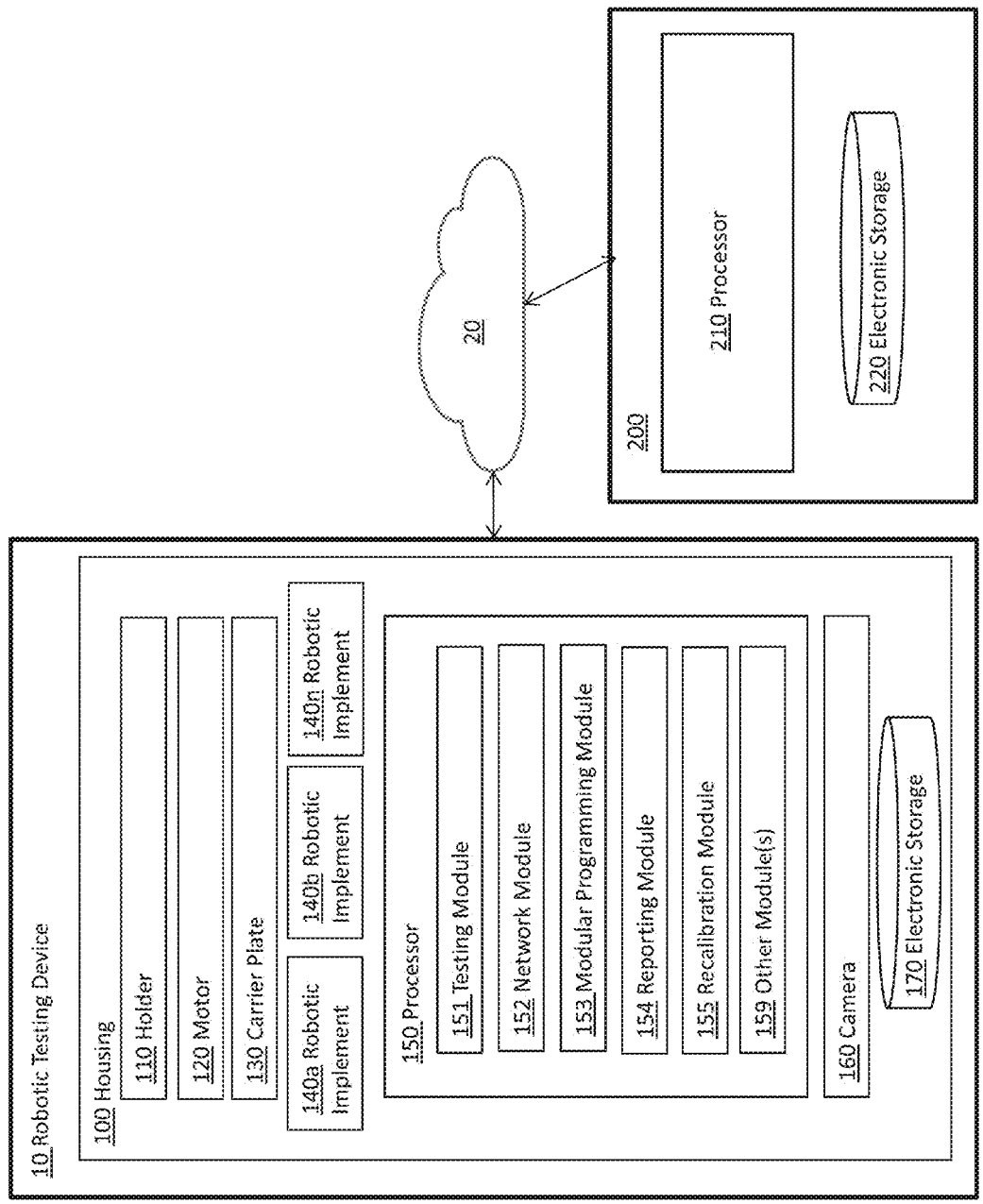
FIG. 1 illustrates an exemplary diagram of a system for robotic testing of a mobile device, according to an aspect of the invention.

The invention described herein relates to a robotic testing device for more closely emulating human movements during robotic testing of mobile devices by using multiple robotic implements to interact with a mobile device, and by facilitating movement of the mobile device during testing.

Overview

The robotic testing device may include a multi-axis platform for emulating user interactions with the mobile device to automatically test a feature or function of the mobile device. The robotic testing device may operate within multiple degrees of freedom, allowing for rotational, tactile, and/or other interaction with the mobile device being tested. Upon successful completion of an automated test executed by the robotic testing device, a test certification may be issued for the mobile device.

The test certification may indicate that one or more features or functions of the mobile device has achieved an acceptable level of performance or other characteristic being tested, which may ensure consistency across a wide range of mobile devices. For example, a device that has achieved a test certification may perform a given function or include a given feature in a manner that is similar to another device that has also achieved the test certification. Accordingly, the test certification may become a de facto or expressly specified industry accepted certification that indicates uniformity across mobile devices that have achieved such certification. Different types of test certifications may be issued. For example, a test certification may relate to a particular function or feature of the mobile device, a particular set of functions or features, or the mobile device as a whole. As manufacturers strive to produce devices that achieve one or more test certifications, the problem of fragmentation may be reduced or eliminated and the user experience across certified mobile devices may be made uniform.

Whether or not a test certificate is issued, to perform automated testing operations, the robotic testing device may include various components such as hardware and/or software components. The robotic testing device may be modular in that a given component may be removed from or interchangeable with another component, added to the robotic testing device, and/or updated. In this manner, the robotic testing device may be customized to provide different testing operations, depending on particular needs.

For example, the hardware of the robotic testing device may be interchangeable such that different robotic implements, different movement capture components (e.g., a camera, sensors embedded within the device, and/or other movement capture components), and/or other hardware components of the robotic testing device may be removably attached to a housing of the robotic testing device. The hardware may be changed depending on the mobile device to be tested, may be updated with a new version of a hardware component, may be updated to replace a broken component, and/or may be updated for other reasons.

Using the hardware components, the robotic testing device may manipulate mobile device components such as a touchscreen, a gyroscope, an accelerometer, a compass, a camera, a tactile (e.g., mechanical) button, and/or other mobile device component, thereby simulating human interactions with the mobile device. Such manipulations may occur simultaneously with one another. For instance, the robotic testing device may tilt, rotate, or otherwise move the mobile device while simultaneously interacting with a touchscreen, a mechanical button, and/or other components of the mobile device. For example, a holder of the mobile device may be configured to move during performance of a test command that causes the movement and potentially other manipulations as well.

The hardware components may include multiple robotic implements configured to interact with a mobile device during testing. One or more of the robotic implements may be configured to move simultaneously, in succession, separately, and/or otherwise interact with a mobile device during performance of a test command that causes one or more manipulations.

The hardware components may be controlled using one or more computer program instructions (e.g., a software component) executing on one or more physical processors, which may be onboard and/or remote from the robotic testing device. For example, the robotic testing device may include a self-contained testing apparatus that performs testing operations based solely on instructions provided by an onboard physical processor. Alternatively or additionally, a remote computing platform may provide one or more commands or other processing instructions to the robotic testing device such that the robotic testing device is completely controlled by the remote computing platform or is cooperatively controlled by both an onboard physical processor and a remote computing platform.

In some implementations, the software components may be modular in that the functionality provided by the software components may be changed based on new or modified computer program instructions for execution by the one or more physical processors. The functionality may be changed depending on the mobile device to be tested, may be updated with a new version of software, and/or may be updated for other reasons.

The robotic testing device may also be used to provide validation for a test application running on a variety of mobile devices, for user experience of pre-determined functionality to be run on the mobile device, for a mobile device operating on a variety of communication carriers, and/or for other types of validation. As discussed further below, the types of validation that may be requested include, for example, validation of an application across different mobile devices, validation of user experience of pre-determined functionality to be run on a mobile device, validation of a mobile device across different mobile carriers, and/or other types of validation. Upon receiving a request for a type of validation, the robotic testing device may conduct one or more tests associated with the type of validation and may prepare a report related to the performance of the mobile device(s) involved in the one or more tests. In some implementations, upon successful validation, an industry-accepted certification may be provided in conjunction with the validation.

In some implementations, the mobile devices chosen for testing may differ by a single attribute. An attribute may comprise, for example, a hardware component, a software component, an operating system, a version of an operating system, and/or other feature of the mobile device.

Exemplary System

FIG. 1 illustrates an exemplary diagram of a system for robotic testing of a mobile device, according to an aspect of the invention. The exemplary system may comprise a robotic testing device 10. In some implementations, the exemplary system may also comprise one or more computing devices 200 operatively coupled to robotic testing device 10 via a network 20, according to an aspect of the invention.

FIGS. 2-4 illustrate exemplary diagrams of different views of robotic testing device 10, according to various aspects of the invention. For example, FIG. 2 illustrates an exemplary diagram of a front view of robotic testing device 10, FIG. 3 illustrates an exemplary diagram of a front view of robotic testing device 10, and FIG. 4 illustrates an exemplary diagram of an isometric view of robotic testing device 10, according to various aspects of the invention.

Robotic testing device 10 may comprise a housing 100 including a holder 110 configured to hold a mobile device, a motor 120, and a carrier plate 130 coupled to motor 120 and to holder 110 and configured to move holder 110 during testing of a mobile device. Robotic testing device 10 may further comprise multiple robotic implements 140a, 140b, . . . , 140n configured to interact with the mobile device, a non-transitory electronic storage device 170 configured to store information related to robotic testing device 10 and the testing of one or more mobile devices, a physical processor 150 programmed with computer readable instructions to execute computer program modules, a camera 160 operatively coupled to processor 150 and configured to view a display of the mobile device disposed in holder 110, and/or other components of robotic testing device 10.

Holder 110 may be configured to hold a mobile device in a fixed position. Holder 110 may be coupled to carrier plate 130, which may be configured to facilitate movement of holder 110 in one or more directions during testing of the mobile device. Carrier plate 130 may be configured to facilitate movement of holder 110 with multiple degrees of freedom. For example, carrier plate 130 may be configured to facilitate movement of holder 110 with six degrees of freedom (e.g., yaw, pitch, roll, vertical, horizontal, and transverse). Carrier plate 130 may be configured to facilitate movement of holder 110 in other ways and with differing degrees of freedom as well.

According to an aspect of the invention, multiple robotic implements 140a, 140b, 140n may be configured to interact with a mobile device placed in holder 110. A first robotic implement 140a and a second robotic implement 140b may, for example, interact with the mobile device simultaneously, in a sequential manner, and/or otherwise in a number of other ways.

Processor 150 may be programmed with computer readable instructions to execute computer program modules. The computer program modules of processor 150 may comprise, for example, a testing module 151 configured to enable testing of the mobile device, a network module 152 configured to facilitate communication with one or more devices 200, a modular programming module 153 configured to revise the functionality executed by the processor, a reporting module 154 configured to provide reports and/or analysis related to the testing of one or more mobile devices, a recalibration module 155 configured to maintain proper calibration of the robotic testing device, and/or other computer program modules 159. Processor 150 may be configured to send one or more test commands to holder 110 and/or multiple robotic implements 140a, 140b, . . . , 140n to interact with the mobile device.

Camera 160 may include a lens and a recorder, with the lens being configured to operatively view holder 110 of the mobile device. Camera 160 may be configured to record interaction between robotic testing device 10 and the mobile device.

In some implementations, camera 160 may capture information relating to an interaction and may store that information in non-transitory electronic storage device 170 in a manner the same or similar to that described in co-pending U.S. patent application Ser. No. 13/692,154 (entitled "System and Method for Objectively Measuring User Experience of Touch Screen Devices," filed Dec. 3, 2012), which is hereby incorporated by reference in its entirety.

Non-transitory electronic storage device 170 may be configured to store information related to, for example, robotic testing device 10 and the testing of one or more mobile devices. Non-transitory electronic storage device 170 may store software algorithms, information determined by processor 150, information for testing mobile devices, information received from components of robotic testing device 10 to function as described herein, and/or other information related to the robotic testing device 10. Non-transitory electronic storage device 170 may also be accessible to one or more other system components including, for example, processor 150, camera 160, one or more computing devices 200, and/or other components.

Other computing devices 200 which may be operatively coupled to robotic testing device 10 via network 20 may comprise a physical processor 210 programmed with computer readable instructions to provide network capabilities for computing device 200 and to facilitate testing of the mobile device, and a non-transitory electronic storage device 220. In some implementations, other computing devices 200 may comprise one or more devices used in an instrumentation platform to perform testing of a mobile device in a manner the same or similar to the actions described in co-pending U.S. patent application Ser. No. 13/692,161 (entitled "System and Method for Analyzing User Experience of a Software Application Across Disparate Devices", filed Dec. 3, 2012), which is hereby incorporated by reference in its entirety.

A mobile device being tested may be any mobile device such as, for example, a personal digital assistant, smart phone, tablet, and/or other mobile device. The mobile device may be capable of communicating with one or more other mobile devices and one or more computing devices (e.g., robotic testing device 10, computing device 200, and/or other devices) over network 20 such as, for example, a public or private network, or any other suitable communication channel. The mobile device may also include other components typically found in mobile devices, including, for example, user input features (e.g., a touch screen, microphone, keyboard, and/or other user input features), speakers, an antenna (and the corresponding signal processing capabilities), and/or other features.

Housing 100

As shown in FIGS. 2-4, housing 100 may comprise a 3-dimensional structure configured to include holder 110, motor 120, carrier plate 130, multiple robotic implements 140a, 140b, 140n, camera 160, non-transitory electronic storage device 170, physical processor 150, and/or the other components. Housing 100 may comprise one or more surfaces including, for example, a bottom surface, one or more side surfaces, and/or other surfaces upon which components of robotic testing device 10 may be attached, integrated, and/or otherwise disposed.

In some implementations, housing 100 may also comprise a router, a server comprising non-transitory electronic storage device 170, an electrical box configured to hold processor 150, an internal compressor and compressed air tank, a power source, and/or other hardware components.

The server may comprise, for example, a Linux server, and/or other type of server. The router may comprise, for example, a wireless AP router, and/or other type of router. The router may be connected to an Ethernet port, a wifi card, and/or other type of network connector.

In some implementations, the electrical box may comprise a programmable logic controller (PLC) and/or associated PLC components as processor 150. The electrical box may be mounted on an inside surface of the housing 100. The electrical box may comprise a NEMA 24×30×10 inch electrical box, and/or other electrical box.

The internal compressor and/or compressed air tank may be mounted on a surface of housing 100. The compressor and air tank may be configured to enable motor 120 to effectuate movement of carrier plate 130, one or more robotic implements 140a, 140b, . . . , 140n, and/or other components of the robotic testing device 10. In some implementations, housing 100 may comprise one or more gauge and dial sets such that an individual gauge and dial set may be configured to display and regulate tracking pressure for a respective individual robotic implement 140a.

The power source of housing 100 may comprise one or more batteries that provide power to the components of robotic testing device 10. In another example, the power source of housing 110 may comprise a power connector to connect to an external power source. The power connector may comprise, for example, a 120 volt 20 A power connector, and/or other type of power connector.

In some implementations, housing 100 may be affixed to a rollable cart, may be part of a wheeled cabinet structure, and/or may comprise another structure that enables robotic testing device 10 to be a standalone, movable device.

In some implementations, housing 100 may have a modular design. For example, housing 100 may comprise one or more available input/output ports, and/or other hardware connectors that may be configured to support addition, removal, and/or updating of components disposed on housing 100. For example, housing 100 may be configured to facilitate addition or removal of one or more robotic implements 140a, 140b, . . . , 140n used for testing a mobile device. In another example, housing 100 may be configured to facilitate addition or removal of non-transitory electronic storage device 170. In another example, housing 10 may be configured to facilitate replacement of a component physically coupled to housing 10.

In some implementations, robotic implements 140a, 140b, . . . , 140n that are coupled to housing 100 for testing may be changed responsive to receiving a request for validation. For example, one type of validation may require a first set of robotic implements, 140a, . . . , 140n, whereas another type of validation may require a second set of robotic implements 140b, 140n different from first set of robotic implements 140a, . . . , 140n. In another example, a customer preference associated with the request for validation may specify the particular robotic implements 140a, 140b, . . . , 140n to be used during testing. In an implementation, a second camera (e.g., a thermal imager camera) (not illustrated in the Figures) may be removably coupled to carrier plate 130. When configured with the second camera, robotic testing device 10 may image a backside (e.g., the side opposing the screen of the mobile device) of a mobile device being tested. In a particular example, when the second camera is a thermal imager camera, robotic testing device 10 may determine temperatures emanating from the mobile device before, during, and/or after various test procedures.

Motor 120

Motor 120 may be coupled to a bottom surface, a side surface, and/or other surface of the housing and/or may be operatively coupled to processor 150. Motor 120 may comprise carrier plate 130 on which holder 110 may be removably fixed. Carrier plate 130 may be compatible with mobile devices of various dimensions. In some examples, carrier plate 130 may be compatible with mobile devices of dimensions less than, for example, 15×150×87 mm.

Motor 120 may comprise one or more drives configured to move carrier plate 130 in one or more directions. For example, motor 120 may comprise a horizontal drive 52 configured to drive the carrier plate 130 along a horizontal axis (e.g., "side-to-side"), a vertical drive 50 configured to drive the carrier plate 130 along a vertical axis, a transverse drive 50 configured to drive carrier plate 130 along a transverse (or lateral) axis (e.g., "front-to-back"), a pitch drive 44 configured to drive carrier plate 130 to tilt forward and backwards, a roll drive 42 configured to drive carrier plate 130 to pivot side to side, a yaw drive 46 configured to drive carrier plate 130 to swivel from side to side, and/or other drives configured to drive the carrier plate 130.

One or more of the drives may be operated simultaneously, in succession, and/or in other ways. The drives of motor 120 may receive commands from processor 150 indicating one or more types of movement (e.g., swivel, pivot, tilt, and/or other type of movement), one or more directions of movement (e.g., along a vertical axis, horizontal axis, transverse axis, any combination thereof, and/or other direction of movement), a distance of movement, an amount of time for which the drive is to move, and/or other parameters relating to movement of carrier plate 130.

In some implementations, an individual set of drives (e.g., one or more of a horizontal drive, vertical drive, transverse drive, a pitch drive, a roll drive, a yaw drive, and/or other drives) may be coupled with carrier plate 130 and with each individual robotic implement 140a, 140b, . . . , 140n of robotic testing device 10.

In some examples, a horizontal drive may comprise, for example, an air table, an air table bracket, a linear bearing, a support plate, an idler pulley, an idler support, a belt, a drive pulley, a gearbox, and/or other components. A horizontal drive may use, for example, 3 mm pitch belts that are 6 mm wide, with 18 T pulleys and linear bearings. Other configurations and sizes for components of the horizontal drive may also be possible. A travel length for a drive may be set so as to allow a set of corresponding robotic implements (e.g., a left robotic implement and a right robotic implement of a same type) to reach sides of the largest mobile device that may be tested using robotic testing device 10. A horizontal drive may be supported by a single linear bearing rail mounted on carrier plate 130 for vertical axis travel.

In some examples, vertical drives may be mounted directly to carrier plate 130. In some examples, a vertical drive may comprise, for example, a linear bearing, an idler pulley, an idler support, a belt, a drive pulley, a gearbox, and/or other components. A vertical drive may also, for example, use 3 mm pitch belts that are 6 mm wide, with 18 T pullets. A vertical servo for a first robotic implement 140a may protrude through carrier plate 130. A belt may be routed along a back of carrier plate 130. A vertical drive for a second robotic implement 140b may be disposed on a front of carrier plate 130. In some implementations, idler pulleys in motor 120 may be 22 T, so to allow for flanged bushings. Other configurations and sizes for components of the vertical drive may also be possible. Vertical travel may be set so as to allow a set of corresponding robotic implements 140a, 140b, . . . , 140n to reach all sides of a mobile device.

A pitch drive may comprise, for example, a carrier plate, a carrier plate gearbox shaft mount, a gearbox right angle, and/or other components.

A roll drive may comprise, for example, a gimbal bracket, a gearbox rotating flange, a gearbox right angle, and/or other components.

A yaw drive may comprise, for example, a rotary table, and/or other components.

In one example, motor 120 may comprise a pitch gearbox and servo controls. For example, carrier plate 130 may be mounted directly to an output shaft of a pitch gearbox of a pitch drive of the motor. The pitch gearbox and servo controls may control pitch of robotic testing device 10. A pitch gearbox may comprise, for example, a device that converts speed and torque. The pitch gearbox and servo may be mounted on a gimbal bracket of the roll drive. The gimbal bracket may provide support to the pitch gearbox, servo, carrier plate 130, robotic implements 140a, 140b, . . . , 140n, drivers, and/or other components coupled to motor 120. Other configurations and/or components may be used in the individual drives as well.

Motor 120 and/or the drives may be configured to move carrier plate 130 in the horizontal, vertical, and transverse directions. For example, carrier plate 130 may be configured to travel 110 mm along the horizontal axis, with a maximum velocity of 2.7 m/s and a maximum acceleration of 350 m/s$^2$. Other travel lengths, maximum velocities, and maximum accelerations along the horizontal axis may also be possible.

In another example, carrier plate 130 may be configured to travel 165 mm along the vertical axis, with a maximum velocity of 2.7 m/s and a maximum acceleration of 200 m/s$^2$. Other travel lengths, maximum velocities, and maximum accelerations along the vertical axis may also be possible.

In another example, the carrier plate 130 may be configured to travel 40 mm along the transverse axis. Other travel lengths, maximum velocities, and maximum accelerations along the transverse axis may also be possible.

Motor 120 and/or the drives may be configured to move carrier plate 130 to have pitch movement, roll movement, yaw movement, and/or other types of movement. For example, carrier plate 130 may also have a pitch movement ranging from +30 degrees to −90 degrees, with a maximum velocity of 1.6 rev/s and a maximum acceleration of 300 rad/s$^2$. Other degree ranges, maximum velocities, and maximum accelerations may also be available for pitch movement.

In another example, carrier plate 130 may also have a roll movement ranging from +90 degrees to −90 degrees, with a maximum velocity of 1.6 rev/s and a maximum acceleration of 600 rad/s$^2$. Other degree ranges, maximum velocities, and maximum accelerations may also be available for roll movement.

In another example, carrier plate 130 may also have a yaw movement ranging from +90 degrees to −90 degrees. Other degree ranges may also be available for pitch movement.

In some implementations, robotic testing device 10 may control and/or change air pressure within housing 100. For example, robotic testing device 10 may control and/or change air pressure within housing 100 to control movement of a robotic implement 140n.

Air control in housing 100 may be performed, for example, via a set of solenoid valves. For example, air control may be performed via four solenoid valves, and/or via any other number of solenoid valves. A first subset of the valves may control the vertical movement of a robotic implement. For example, the first subset of valves may control the up/down movement of a stylus. A second subset of the valves may control transverse axis rotation of the carrier plate 130. A third subset of the valves may control the provision of air to robotic implement 140a, 140b, 140n. For example, a third subset of the valves may control the provision of air to a stylus tracking regulator.

In some implementations, air pressure may be monitored with a transducer, a digital gage, and/or other air pressure monitoring components. Each individual valve, and any air tanks that may be used, may have limits on the amount of air use at a time or in entirety.

In an implementation, each pneumatic axis (Z axis, Extended Pitch, and Yaw) may include one or more limit switches that detect when a particular pneumatic axis is extended or retracted. For example, two limit switches may be associated with a yaw axis. One switch may detect when yaw is in its extended state, which is 90 degrees, and the other limit switch may detect when yaw is in its retracted state. Whichever switch is on will alert processor 150 via an electric signal that the axis has reached that particular state. The limit switches therefore inform processor 150 of the status of an associated pneumatic axis at any given time.

Holder 110

According to an aspect of the invention, holder 110 of robotic testing device 10 may be configured to hold a mobile device and move in one or more dimensions during testing of the mobile device. Holder 110 may be operatively coupled to processor 150, removably affixed to carrier plate 130 of motor 120, and/or otherwise integrated with robotic testing device 10. Holder 110 may be disposed on carrier plate 130, such that, when carrier plate 130 is driven by motor 120, holder 110 may also be moved in a same manner. Holder 110 may hold the mobile device to enable visual access to a touchscreen of the mobile device, one or more cameras (e.g., a front-facing camera, a back-facing camera, and/or other camera) disposed on the mobile device, a plurality of buttons, keys, and/or other hardware input components disposed on a front, side, top, back, and/or other surface of the mobile device, and/or visual access to other components of the mobile device. For example, camera 160 operatively coupled to robotic testing device 10 may record the interaction between holder 110, multiple robotic implements 140a, 140b, 140n, the mobile device, and/or other components of robotic testing device 10 during testing of the mobile device.

In some implementations, holder 110 may comprise a base surface on which the mobile device may be held. When stationary, the base surface of holder 110 may be parallel to a bottom surface of housing 100.

Holder 110 may be configured to hold a mobile device in a fixed position within the holder. In some implementations, holder 110 may comprise a set of fixtures configured to secure the mobile device in position. The set of fixtures may comprise, for example, a set of clamps configured to clamp the mobile device to a base surface of holder 110, and/or other types of fixtures.

In some implementations, the carrier plate 130 to which holder 110 is mounted may be configured to mount different types of holders, where a first holder may be configured to hold a mobile device of a first size and a second holder may be configured to hold a mobile device of a second size.

Robotic Implements 140a, 140b, . . . , 140n

According to an aspect of the invention, robotic implements 140a, 140b, . . . , 140n may interact with the mobile device during testing. Robotic implements 140a, 140b, . . . , 140n used for testing a mobile device may be of the same type or may be of different types. The types of robotic implements 140a, 140b, . . . , 140n may comprise a robotic finger, a stylus, a roller ball, a wheel, and/or other robotic implement capable of interacting with a mobile device during testing.

Robotic implements 140a, 140b, . . . , 140n may be configured to interact with the mobile device in various ways. One or more of robotic implements 140a, 140b, . . . , 140n may be configured to depress keys, depress buttons, and/or otherwise interact with a hardware input component of the mobile device during testing. One or more of robotic implements 140a, 140b, . . . , 140n may be configured to interact with a touch screen of the mobile device during testing. For example, one or more of robotic implements 140a, 140b, . . . , 140n may be configured to simulate a sliding motion, a tapping motion, a touch, a prolonged depression on the touch screen, a hovering over one or more portions of the touch screen, and/or other user interaction with a touchscreen. One or more of robotic implements 140a, 140b, . . . , 140n of the robotic testing device 10 may be configured to move separately, move sequentially, move simultaneously, and/or otherwise interact with the mobile device.

The movement of robotic implement 140a may emulate, for example, a human wrist. In some implementations, robotic implement 140a may be pressure loaded onto a screen of a mobile device. For example, robotic implement 140a may be pressure loaded onto a screen of a robotic device with an adjustable amount of tracking force. Robotic implement 140a may be moved at a force of 5 psi and may have no rubber seals that affect movement. Other forces and number(s) of rubber seals may be used with robotic implement 140a.

A contact portion of robotic implement 140a (e.g., a portion of robotic implement 140a that may contact or be in closest proximity to the mobile device) may have a clearance area around the robotic implement 140a. The design of a clearance area around robotic implement 140a may enable an area around the length of robotic implement 140a to act as an orifice to maintain a pressure drop across the contact portion.

In some examples, robotic implement 140a may be raised and lowered on an air table mounted on a horizontal linear bearing of a horizontal drive of motor 120. The air table may have a longer travel area than robotic implement 140a. In an example in which the air table is raised, robotic implement 140a may be above the screen. In an example in which the air table is lowered or at a regular height, robotic implement 140a may be compressed midway on its travel and may ride on the screen. In an example in which robotic implement 140a is outside of the footprint of the mobile device and the air table is lowered or at a regular height, robotic implement 140a may be extended such that a contact portion of robotic implement 140a is alongside the device, allowing, for example, for operation of hard keys and buttons on a side of the device.

Robotic implements 140a, 140b, . . . , 140n may each be configured to move in the horizontal, vertical, and transverse directions. For example, robotic implement 140a may be configured to travel 110 mm along the horizontal axis, with a maximum velocity of 2.7 m/s and a maximum acceleration of 350 m/s$^2$. Other travel lengths, maximum velocities, and maximum accelerations along the horizontal axis may also be possible.

In another example, robotic implement 140a may be configured to travel 165 mm along the vertical axis, with a maximum velocity of 2.7 m/s and a maximum acceleration of 200 m/s$^2$. Other travel lengths, maximum velocities, and maximum accelerations along the vertical axis may also be possible.

In another example, robotic implement 140a may be configured to travel 40 mm along the transverse axis. Other travel lengths, maximum velocities, and maximum accelerations along the transverse axis may also be possible.

The robotic implements 140a, 140b, . . . , 140n may each be configured to have pitch movement, roll movement, yaw movement, and/or other types of movement. For example, robotic implement 140a may also have a pitch movement ranging from +30 degrees to −90 degrees, with a maximum velocity of 1.6 rev/s and a maximum acceleration of 300 rad/s$^2$. Other degree ranges, maximum velocities, and maximum accelerations may also be available for pitch movement.

In another example, robotic implement 140a may also have a roll movement ranging from +90 degrees to −90 degrees, with a maximum velocity of 1.6 rev/s and a maximum acceleration of 600 rad/s$^2$. Other degree ranges, maximum velocities, and maximum accelerations may also be available for roll movement.

In another example, robotic implement 140a may also have a yaw movement ranging from +90 degrees to −90 degrees. Other degree ranges may also be available for pitch movement.

In some implementations, robotic testing device 10 may comprise one or more tools configured to display and regulate tracking pressure of one or more of multiple robotic implements 140a, 140b, . . . , 140n. For example, robotic testing device 10 may comprise a gauge and dial to display and regulate tracking pressure of one or more of multiple robotic implements 140a, 140b, . . . , 140n.

In an implementation in which robotic implement 140a comprises a stylus, the stylus may comprise, for example, a double length linear ball bearing to guide a 3 mm diameter rod of the stylus. The rod may comprise, for example, an aluminum tip pressed on its end. A conductive rubber stylus cover may be mounted on the aluminum tip. In some examples, the tip may have a gum rubber sleeve above the conductive rubber stylus cover. Other size rods may be used for a stylus. Other types of tips may also be used for a stylus.

Robotic implement 140a may receive one or more commands from processor 150 indicating one or more types of movement, one or more directions of movement, a distance of each movement, an amount of time for each movement to be performed, and/or other parameters relating to movement of robotic implement 140a.

Robotic implement 140a configured to interact with the mobile device during testing may be affixed to housing 100, to motor 120, to carrier plate 130, to holder 110, and/or to other components of robotic testing device 10. For example, first robotic implement 140a may be coupled to housing 100, whereas second robotic implement 140b may be coupled to holder 110.

Robotic implements 140a, 140b, . . . , 140n may be configured to move independently from carrier plate 130 and holder 110. For example, robotic implement 140a may be operatively coupled to a set of drives configured to move robotic implement 140a along the horizontal, vertical, and/or transverse axes. The set of drives may move according to one or more commands received from processor 150 indicating one or more directions of movement, a length of movement, and/or other parameters relating to movement of robotic implement 140a. In some implementations, first robotic implement 140a may be operatively coupled to a first set of one or more drives configured to move first robotic implement 140a independently from carrier plate 130 and holder 110, and second robotic implement 140b may be operatively coupled to a second set of one or more drives to move second robotic implement 140b independently from carrier plate 130, holder 110, and first robotic implement 140a, where the second set may be the same as or different from the first set.

Non-Transitory Electronic Storage Device 170

Non-transitory electronic storage device 170 may comprise computer program modules, one or more test scripts, a list of current program modules, and/or other information related to robotic testing device 10. Non-transitory electronic storage device 170 may be physically coupled to robotic testing device 10 and/or may comprise removable storage that is removably connectable to robotic testing device 10 via, for example, a port (e.g., a USB port, a firewire port, and/or other type of port), a drive (e.g., a disk drive, and/or other type of drive), and/or other connector.

In some implementations, one or more databases comprising non-transitory electronic storage device 170 may be, include, or interface to, for example, an Oracle™ relational database sold commercially by Oracle Corporation. Other databases, such as Informix™, DB2 (Database 2) or other data storage, including file-based, object, or query formats, platforms, or resources such as OLAP (On Line Analytical Processing), SQL (Standard Query Language), NoSQL, a SAN (storage area network), Microsoft Access™ or other form of database may also be used, incorporated, or accessed. The database may comprise one or more such databases that reside in one or more physical devices and in one or more physical locations. The database may store a plurality of types of data and/or files and associated data or file descriptions, administrative information, or any other data.

In some implementations, each non-transitory electronic storage device 170 may be part of or hosted by robotic testing device 10, a computing device on network 20, one of computing devices 200, a cloud storage device, and/or other device. In some implementations, non-transitory electronic storage device 170 may be physically separate from robotic testing device 10 but may be operatively communicable therewith.

Non-transitory electronic storage device 170 may include one or more of optically readable storage media (e.g., optical disks, and/or other type of optically readable storage media), magnetically readable storage media (e.g., magnetic tape, magnetic hard drive, floppy drive, and/or other type of magnetically readable media), electrical charge-based storage media (e.g., EEPROM, RAM, and/or other electrical charge based-storage media), solid-state storage media (e.g., flash drive, and/or other type of solid-state storage media), and/or other electronically readable storage media. Non-transitory electronic storage device 170 may include one or more virtual storage resources (e.g., cloud storage, a virtual private network, and/or other virtual storage resources).

Non-transitory electronic storage device 170 may store software algorithms, information related to validation types, information determined by processor 150, information for testing mobile devices, information received from components of robotic testing device 10 to function as described herein, and/or other information related to robotic testing device 10. Non-transitory electronic storage device 170 may also be accessible to one or more other system components including, for example, processor 150, camera 160, other computing device 200, and/or other components.

Non-transitory electronic storage device 170 may also be configured to store information related to a plurality of mobile devices that may be tested using robotic test device 10. For example, for an individual mobile device, non-transitory electronic storage device 170 may be configured to store device specifications (e.g., device component descriptions, device component measurements, and/or other device specifications), information related to test commands performed on the device, a sequence of the commands performed, output and contextual data related to performance of a command, errors encountered during testing of the mobile device, and/or other information related to the mobile device.

Non-transitory electronic storage device 170 may also be configured to store information related to robotic testing device 10. For example, non-transitory electronic storage device 170 may store information related to the hardware available on robotic testing device 10, parameters associated with acceptable movement for one or more components of robotic testing device 10, a list of current computer program modules to be executed via robotic testing device 10, a time of last calibration of robotic testing device 10, and/or other information related to robotic testing device 10.

In some implementations, non-transitory electronic storage device 170 may be configured to store an association of a set of computer program modules with an individual mobile device type, an operating system of a mobile device, a set of hardware components of a mobile device, and/or other feature of a mobile device. In these implementations, the computer program modules associated with a mobile device may be based on the features of the mobile device during testing of the mobile device.

In some implementations, non-transitory electronic storage device 170 may store one or more test scripts associated with an individual mobile device type, an operating system of a mobile device, a set of hardware components of a mobile device, and/or other feature of a mobile device. In these implementations, the one or more test scripts associated with a mobile device based on the features of the mobile device during testing of the mobile device. For example, an individual associated test script may comprise a set of commands in a sequential order.

In some implementations, the test script may comprise, for an individual command of the set of commands, one or more inputs associated with the individual command, one or more outputs to be recorded for the individual command, an amount of time of performance of the individual command, and/or other information related to a command. For an associated test script, the set of commands in the test script are performed on the mobile device, via robotic testing device 10, in the sequential order specified.

Physical Processor 150

Physical processor 150 may be programmed with computer readable instructions to execute computer program modules to cause robotic testing device 10 to perform functionality. In some implementations, processor 150 may be physically coupled to housing 100. In some implementations, processor 150 may be disposed in a separate device and may be operatively coupled to housing 100 via network 20. For example, processor 150 may communicate with robotic testing device 10 via wired or wireless data connections and/or through circuitry disposed in housing 100 and/or other components of robotic testing device 10.

The computer program modules may comprise, for example, a testing module 151 configured to enable testing of a mobile device, a network module 152 configured to facilitate communication with other devices, a modular programming module 153 configured to receive computer program modules for the processor to execute from other devices, a recalibration module 154 configured to maintain proper calibration of robotic testing device 10, a reporting module 155 configured to provide reports and/or analysis related to robotic testing device 10 and/or testing of one or more mobile devices, and/or other computer program modules 159.

Processor 150 may be programmed with computer readable instructions to provide information processing capabilities for robotic testing device 10. As such, processor 150 may include one or more of a digital processor, an analog processor, a digital circuit designed to process information, an analog circuit designed to process information, a state machine, and/or other mechanisms for electronically processing information. Although processor 150 is shown in FIG. 1 as a single entity in robotic testing device 10, this is for illustrative purposes only. In some implementations, processor 150 may include a plurality of processing units. These processing units may be physically located within robotic testing device 10, or processor 150 may represent processing functionality of a plurality of devices operating in coordination with robotic testing device 10.

Processor 150 may be programmed to execute computer readable instructions to cause robotic testing device 10 to perform specific functionality. Processor 150 may be programmed to execute computing readable instructions to cause robotic testing device 10 to perform specific functionality by software; hardware; firmware; some combination of software, hardware, and/or firmware; and/or other mechanisms for configuring processing capabilities on processor 150.

Testing Module 151

Testing module 151 may be configured to enable one or more test commands to be performed via robotic testing device 10. For example, testing module 151 may be configured to enable performance of a set of test commands for validation of a mobile device (or set of devices). A test command may comprise information related to one or more components affected by the test command, one or more movements associated with the respective one or more components, an amount of time the test command may be performed, input data for the test command, output data to receive and/or store based on the performance of the test command, one or more environmental changes to occur during performance of the test command, and/or other information related to performance of the test command.

Components affected by a test command may comprise, for example, a touchscreen of the mobile device, an accelerometer of the mobile device, a gyroscope of the mobile device, a compass of the mobile device, one or more keys of the mobile device, one or more buttons of the mobile device, and/or other component of the mobile device.

Environmental changes that may occur during performance of a test command may comprise, for example, a change in a WiFi environment, change in a GPS environment, change in a RF environment, change in temperature, change in humidity, change in brightness, and/or other environmental changes.

A test command may be performed by robotic testing device 10 to test various components and/or functionality on a mobile device. For example, a test command may test a touchscreen, an accelerometer, a gyroscope, a compass, hard keys, buttons, and/or other components of a mobile device.

A test command may also test the ability of the mobile device to connect to the internet, to reboot, to take pictures via the camera, to change screen orientation, to move objects displayed on the touch screen, to change the size of objects displayed on the touch screen, to affect an application running on the mobile device or objects displayed on the touch screen based on motion of the mobile device (e.g., a rotation, tilt, shake, and/or other movement of the mobile device), to change screen brightness in response to a change in ambient lighting, and/or other functionality available on a mobile device.

In some implementations, a test command may comprise one or more holder commands, one or more implement commands, one or more input commands, and/or other sub-commands that constitute a test command of a mobile device. The holder commands may comprise one or more instructions regarding how holder 110 should be moved during the test operation of the mobile device. The one or more implement commands may comprise one or more instructions as to which robotic implements 140a, 140b, . . . , 140n should be used, how an individual robotic implement 140a should be moved, a type of interaction between individual robotic implement 140a and the mobile device, and/or other instructions related to an interaction between robotic implement 140a and the mobile device. One or more input commands may comprise instructions regarding input data to enter into the mobile device.

Robotic testing device 10 may record and/or analyze the response to a test command. A response to a test command may comprise a response of the mobile device being tested after execution of all holder commands, implement commands, input commands, and/or other commands that constitute the test command. Robotic testing device 10 may also record and/or analyze the response to a test command as well as individual responses to the individual holder commands, implement commands, input commands, and/or other sub-commands that constitute the test command.

Test commands may be stored in non-transitory electronic storage device 170 operatively coupled to processor 150, received from other devices 200 via network 20, and/or otherwise obtained by robotic testing device 10.

In some implementations, testing module 151 may obtain a test command via an instrumentation platform operatively coupled to processor 150. The instrumentation platform may be configured to facilitate analysis of user interaction based on a set of test operations conducted with the mobile device. For example, the instrumentation platform may be an Ape platform.

In some implementations, testing module 151 may perform a first test command on the mobile device, transmit contextual data obtained from performance of the first test device on the mobile device via the instrumentation platform, and receive a next test command to perform based on the transmitted contextual data. The test commands received via the instrumentation platform may be based on receipt, at the instrumentation platform, of information related to the mobile device being tested. For example, the test commands received may be based on a type of mobile device being tested, a type of validation requested for the mobile device, an operating system running on the mobile device, a set of hardware components of the mobile device, and/or other features of the mobile device.

In some implementations, testing module 151 may obtain one or more test commands from a test script for testing the mobile device. The test script may be stored in non-transitory electronic storage device 170, may be obtained from another device 200 via network 20, and/or may be obtained from another source. As mentioned above, a test script may be associated with a validation type associated with testing the mobile device, one or more features of a mobile device, and/or other characteristics associated with testing the mobile device.

In some implementations, testing module 151 may perform a set of test commands based on a type of validation requested by a customer. The request by a customer will be further discussed below, with respect to reporting module 154. The set of commands may be associated with a test script, may be stored in non-transitory storage device 170, and/or may otherwise be obtained.

In some implementations, the set of commands may be obtained via the instrumentation platform. For example, testing module 151 and/or robotic testing device 10 may communicate to the instrumentation platform information related to the mobile device, a validation type for testing, contextual data related to the mobile device, and/or other information related to testing the mobile. As discussed further below, the types of validation that may be requested include, for example, validation of an application across different mobile devices, validation of user experience of pre-determined functionality to be run on a mobile device, validation of a mobile device across different mobile carriers, and/or other types of validation.

Testing module 151 may be configured to enable performance of one or more test commands on an individual mobile device. In some implementations, testing module 151 may be configured to interact with one or more drivers of motor 120, one or more robotic implements 140a, 140b, . . . , 140n, and/or other components affected by the test command to facilitate movement of the associated components in conjunction with the test command. For example, testing module 151 may be configured to interact with other components of robotic testing device 10 via circuitry in housing 100 of robotic testing device 10, via wired or wireless communication over network 20, and/or by other types of communications.

In some implementations, testing module 151 may also be configured to capture a response of an individual mobile device to performance of a test command on the individual mobile device. For example, testing module 151 may receive the response of the individual mobile device via circuitry of housing 100, via wired communication or wireless communication over network 20, and/or by other types of communication.

In another example, camera 160 may record the response of the individual mobile device to performance of the test command. Other methods of recording the response may also be used. Testing module 151 may store the response in non-transitory storage device 170, may transmit the response to another device 200 and/or may otherwise handle the response.

Network Module 152

Network module 152 may be configured to enable robotic testing device 10 to communicate with other devices and/or components of robotic testing device 10 via network 20. Network 20 may be a public or private network or any other suitable communication channel.

For example, network module 152 may be configured to receive data, test commands, computer program modules, and/or other information from other devices 200 via network 20. In some implementations, network module 152 may facilitate communication via an instrumentation platform.

Modular Programming Module 153

Modular programming module 153 may be configured to facilitate customization of the performance of the processor for robotic testing device 10. For example, a first set of computer program modules executed by first processor of first robotic testing device may differ from a second set of computer program modules executed by a second processor of a second robotic testing device. The test commands, instructions, and/or other data stored in a first non-transitory electronic storage device operatively coupled to the first processor may be different or may be the same as test commands, instructions, and/or other data stored in a second storage non-transitory electronic storage device operatively coupled to the second processor.

In another example, a first set of computer program modules executed by a first processor of a first robotic testing device may be replaced with a second set of computer program modules. In these examples, the first set of computer program modules may comprise different computer program modules than the second set of computer program modules. For example, a version of a computer program module of the first set of computer programs may differ from a version of a corresponding computer program module of the second set of computer program modules.

Modular programming module 153 may be configured to receive computer program modules from other devices 200, revise the computer program modules executed by processor 150, update a listing of computer program modules to be executed, revise an association between a set of computer program modules and a mobile device, and/or perform other functionality related to the performance of robotic testing device 10.

Modular programming module 153 may be configured to receive an instruction, a computer program module, and/or other data relating to the functionality of robotic testing device 10 from another device (e.g., computing device 200). The instruction may be a delete instruction, a revise instruction, an add instruction, and/or other instruction. Modular programming module 153 may be configured to apply the instruction to the computer program module.

Responsive to the instruction being a delete instruction, modular programming module 153 may remove the computer program module indicated in the delete instruction from the list of current computer program modules. In some implementations, modular programming module 153 may delete the computer program module from non-transitory electronic storage device 170. In some implementations, modular programming module 153 may mark the computer program module as inactive.

Responsive to the instruction being a revise instruction, modular programming module 153 may determine whether the list of computer program modules comprises the computer program included in the instruction. Responsive to a determination that the list includes that computer program module, modular programming module 153 may replace the indicated computer program module in non-transitory electronic storage device 170 with the computer program module received with the instruction. Responsive to a determination that the list does not include the computer program module, the list may be updated to add information related to the computer program module, and the computer program module may be stored in non-transitory electronic storage device 170.

Responsive to the instruction being an add instruction, modular programming module 153 may store the received computer program module in non-transitory electronic storage device 170 and may update the list of current computer program modules.

In some implementations, processor 150 may only execute the computer program modules included in the list of current computer program modules. In some implementations, processor 150 may only execute those computer program modules that are not marked as inactive.

In some implementations, modular programming module 153 may receive computer program modules from a server operatively coupled to robotic testing device 10. For example, the server may be an Ape server. Modular programming module 153 may ping the Ape server for updates, additions, and deletions to the computer program modules at pre-determined intervals, upon an error occurring at robotic testing device 10, and/or for other reasons. The received computer program modules may include, without limitation, job servers, station managers, instrumentation framework software, one or more databases, a runner server, and/or other components, Reporting Module 154

Reporting module 154 may be configured to facilitate analysis and report information related to information stored at non-transitory electronic storage device 170. For example, reporting module 154 may be configured to prepare validation reports comprising information related to validation and/or testing of a mobile device (or set of devices). In another example, reporting module 154 may be configured to provide one or more reports related to errors that occurred during testing of a mobile device, one or more reports comprising information related to test operations conducted at one or more mobile devices, and/or other information related to testing of mobile devices. In another example, reporting module 154 may be configured to prepare and/or display reports including statistics regarding testing of one or more mobile devices. The types of reports prepared by reporting module 154 are not limited to the examples described herein.

In some implementations, reporting module 154 may be configured to provide a validation report related to testing one or more mobile devices according to industry accepted standards. Reporting module 154 may be configured to provide one or more types of validation reports. Reporting module 154 may be configured to provide a validation report related to testing one or more mobile devices responsive to receiving a request for validation from a customer. A customer may comprise, for example, a mobile application developer, a phone manufacturer, a wireless carrier, and/or other types of customers.

The request for validation may comprise a type of validation requested, information related to the one or more mobile devices to be tested, customer preferences regarding information to be included in the validation report, and/or other information related to the validation request. The customer preferences may comprise, for example, a type of comparison to perform between the test results and the metrics for validation, a list of types of robotic implements 140a, 140b, . . . , 140n to use in testing, a set of commands to perform and/or not perform during testing, information to include in the validation report, and/or other information related to validation and/or testing of the mobile device. Responsive to receiving the validation request, reporting module 154 may prompt the testing of the mobile device by robotic testing device 10.

In some implementations, reporting module 154 and/or processor 150 may be configured to receive a request for validation from a customer for a particular mobile device, set of mobile devices with particular ids, set of mobile devices with a particular operating system, set of mobile devices with a particular set of hardware components, and/or other grouping of mobile devices. Reporting module 154 may cause the type of validation associated with the request to be stored in non-transitory electronic storage device 170. Testing module 151 and/or processor 150 may use the type of validation requested to determine the test commands to use on an individual mobile device during testing of the mobile device.

Numerous types of validation may be provided by the customer. In some implementations, non-transitory electronic storage device 170 may store a plurality of acceptable validation types. In some implementations, an instrumentation platform operatively coupled to robotic testing device 10 may store the plurality of acceptable validation types. For example, a type of validation may comprise validation for a test application tested across multiple types of devices.

In another example, another type of validation may comprise validation for user experience and performance of pre-determined functionality on a mobile device. User experience may include, for example, a camera display of the mobile device, gaming capabilities, battery life, application experiences, and/or other user experience of a mobile device.

In yet another example, another type of validation may comprise validation for accuracy and performance of a mobile device across one or more data and/or wireless signal carriers. The types of validations (and corresponding validation reports prepared by reporting module) are not limited to the examples described herein.

A type of validation may be associated with a set of test commands to be performed in order to receive validation. In some examples, a type of validation for a set of mobile devices may cause a first set of test commands to be performed at a first mobile device and a second set of test commands to be performed at a second mobile device, where the first set of test commands is different from the second set of test commands.

Reporting module 154 may generate a validation report comprising information relating to the performance of a particular mobile device during testing, a set of mobile devices with particular ids, a set of mobile devices with a particular operating system, a set of mobile devices with a particular set of hardware components, and/or other grouping of mobile devices. The report may comprise, for example, information related to one or more of: the set of test commands executed during the test, results of performance of each individual test command, performance related to type of test commands executed, test scripts used during testing, information related to previous testing of that grouping of mobile devices (e.g., number of times testing of that grouping of mobile devices has been performed, previous performance results, and/or other information), and/or other information related to the testing of the grouping of mobile devices.

In some implementations, reporting module 154 may obtain data for the report based on the recording of the performance of the test command and the response of the mobile device by camera 160 of robotic test device 10. Robotic testing device 10 may capture the recording of the interaction and response and may analyze the captured data in a manner the same or similar to that described in co-pending U.S. patent application Ser. No. 13/692,154 (entitled "System and Method for Objectively Measuring User Experience of Touch Screen Devices," filed Dec. 3, 2012), incorporated by reference in its entirety above. As such, reporting module 154 and/or robotic testing device 10 may determine whether a test command was properly performed, and may record a corresponding response of the mobile device for later analysis.

Reporting module 154 may compare the results of performing the set of test commands to a pre-stored set of optimal results (e.g., stored at non-transitory electronic storage device 170 and/or at another device operatively coupled to the robotic testing device 10). For each test command, the result of performing the test command may be compared to a pre-stored result. For example, a result may comprise one or more values of one or more parameters that may be measured from the action taken by the mobile device in response to the performance of the test command.

In some implementations, for an individual type of validation, non-transitory electronic storage device 170 may store a set of test commands, a set of parameters associated with an individual test command, and one or more levels associated with an individual parameter, and/or other information relating to validation. In some implementations, the instrumentation platform may store the set of test commands, set of parameters, one or more levels, and/or other information for the individual type of validation.

A parameter may comprise a quantitative value that may be measured from a response to the test command, an attribute related to the test command (e.g., speed of response, and/or other attribute), and/or other indicator of measurement related to the performance of the test command. A level associated with an individual parameter may comprise a range of values for each parameter measured in the result. A level may be associated with a qualitative value (e.g., acceptable, below average, optimal, and/or other qualitative indicators on performance) or a quantitative value.

Non-transitory electronic storage device 170 (and/or the instrumentation platform) may also store, for the type of validation, metrics related to acceptable responses to the test commands. Reporting module 154 may use the metrics to determine whether the performance of a mobile device in response to the set of test commands may be validated. The metrics may comprise, for example, one or more acceptable levels for each parameter, a number of test commands for which acceptable levels are required, a list of test commands for which acceptable levels are required, and/or other metrics by which to determine whether a mobile device performance is validated.

For a validation related to an individual mobile device, reporting module 154 may compare the actual performance results of the mobile device against the metrics related to the validation. Reporting module 154 may generate a report for the customer that requested the validation. The report may comprise, for example, information related to the customer, information related to the mobile device (e.g., specifications of the mobile device, an identifier of an operating system of the mobile device, and/or other information related to the mobile device), information related to the validation requested, a list of the test commands performed on the mobile device, and validation results.

In some implementations, the report may also comprise the metrics used for validation, a comparison of the performance results of the mobile device against the metrics, performance results of individual test commands, and/or other information related to the validation and/or testing of the mobile device. The information included in the report may be based on customer preferences of the customer that requested validation.

In an implementation in which a validation is related to a set of mobile devices, reporting module 154 may compare performance results of the set of mobile devices to the metrics related to validation based on customer preferences for validation. In one example, reporting module 154 may aggregate the actual performance results of the mobile devices and may compare the aggregated performance results against the metrics related to the validation.

In another example, the reporting module 154 may compare the performance results of each individual mobile device against the metrics related to validation. In this example, the metrics may set forth a number of devices that need to pass validation, a number of devices for which acceptable levels are required for a particular parameter, and/or other requirements for validation. Responsive to a customer not specifying a type of comparison, a default comparison may comprise aggregating the performance results from the set of devices.

In the implementation in which a validation is related to a set of mobile devices, reporting module 154 may generate a validation report for the customer that requested the validation. The report may comprise, for example, information related to the customer, information related to the set of mobile devices (e.g., specifications of the individual mobile devices, an identifier of an operating system of the individual mobile devices, and/or other information related to the individual mobile devices), information related to the validation requested, a list of the test commands performed on the mobile devices, and validation results.

In some implementations, the report may also comprise the metrics used for validation, the type of comparison performed to determine validation, a comparison of the performance results of the mobile devices against the metrics, performance results of individual test commands, and/or other information related to the validation and/or testing of the set of mobile devices. The information included in the report may be based on customer preferences of the customer that requested validation.

In some implementations, reporting module 154 may generate a report comprising a comparison of ratings related to user experience across one or more mobile devices. For example, reporting module 154 may determine ratings for one or more mobile devices across a predetermined set of categories related to user experience. The pre-determined set of categories may be stored at non-transitory storage device 170, be received from a customer requesting the comparison of ratings, and/or may otherwise be determined.

For example, for an individual user experience category, reporting module 154 may determine a rating for the user experience category for a mobile device by determining one or more parameters related to the user experience category. Reporting module 154 may obtain information related to the parameter based on the testing of the mobile device, access a scoring rubric related to the parameter, and determine a rating for the user experience category for the mobile device based on the scoring rubric. Other ways of determining a rating for the user experience category for the mobile device may also be used. The functionality of reporting module 154 with regarding to determining ratings is not limited to the examples described herein.

In one implementation, reporting module 154 may facilitate a search for information related to testing of one or more mobile devices. For example, reporting module 154 may facilitate a search for errors that occurred at mobile devices with a set of specific attributes. In another example, reporting module 154 may facilitate a search for types of test operations conducted on mobile devices with a set of specific attributes. The types of searches facilitated by reporting module 154 are not limited to the examples described herein.

Reporting module 154 may generate reports relating to testing of a mobile device. Reporting module 154 may generate a report at pre-determined time intervals, in response to a request by an application developer, in response to a request by a customer, upon completion of testing of the mobile device, and/or at other times.

Recalibration Module 155

In some implementations, recalibration module 155 may be configured to determine accuracy of robotic testing device 10, perform recalibration on robotic testing device 10, and/or perform other functionality related to calibrating robotic testing device 10.

Recalibration module 155 may determine accuracy of robotic testing device 10 by comparing performance of one or more hardware components of robotic testing device 10 (e.g., movement of carrier plate 130, movement of robotic implements 140a, 140b, . . . , 140n, etc.) against parameters stored in non-transitory electronic storage device 170.

In some implementations, one or more of the parameters stored in non-transitory electronic storage device 170 may comprise position accuracy and repeatability of position along the horizontal, vertical, and transverse axes. Position accuracy may comprise, for example, deflection of robotic testing device 10 and/or carrier plate 130 under load. Repeatability may comprise, for example, mechanical backlash in robotic testing device 10 and/or carrier plate 130 under no load conditions.

In some examples, along the horizontal axis, non-transitory electronic storage device 170 may store a position accuracy metric of +−0.025 mm, with a repeatability metric of +−0.0125 mm. In another example, along the vertical axis, non-transitory electronic storage device 170 may store a position accuracy metric of +−0.025 mm, with a repeatability metric of +−0.0125 mm. For example, along the transverse axis, non-transitory electronic storage device 170 may or may not store a position accuracy metric or a repeatability metric. The metrics and corresponding metric values that may be stored in non-transitory electronic storage device 170 are not limited to the examples described herein.

In some implementations, one or more of the parameters stored in non-transitory electronic storage device 170 may comprise position accuracy and repeatability of position with respect to pitch movement, roll movement, yaw movement, and/or other types of movement. For example, for pitch movement, non-transitory electronic storage device 170 may store a position accuracy metric of +−0.04 degrees, with a repeatability metric of +−0.02 degrees. In another example, for roll movement, non-transitory electronic storage device 170 may store a position accuracy metric of +−0.04 degrees, with a repeatability metric of +−0.02 degrees. For example, for yaw movement, non-transitory electronic storage device 170 may or may not store a position accuracy metric or a repeatability metric. The metrics and corresponding metric values that may be stored in non-transitory electronic storage device 170 are not limited to the examples described herein.

Responsive to a determination that a hardware component of robotic testing device 10 is operating outside of stored parameters, recalibration module 155 may perform recalibration of robotic testing module 10. In some implementations, recalibration module 155 may automatically perform recalibration at pre-determined intervals, upon receiving a request to perform recalibration from another device via network 20, upon a failure of a component of robotic testing device 10, and/or for other reasons. In some implementations, responsive to a determination that a hardware component of robotic testing device 10 is operating outside of stored parameters, recalibration module 155 may send a notification to a user of robotic testing device 10 regarding the need for recalibration.

In an implementation, robotic testing device 10 may perform the recalibration responsive to the notification. For instance, for pneumatic axes, robotic testing device 10 may use flow control valves that regulate the pressure delivered to each axis, which in turn calibrate the speed and force of each pneumatic actuator. For motion-controlled axes, robotic testing device 10 may use one or more computer program modules that calibrate each axis.

Camera 160

Camera 160 may comprise a lens and a recorder, with the lens operatively positioned to view holder 110 for the mobile device. Camera 160 may be mounted on housing 100, on carrier plate 130, on holder 110, and/or another component of robotic testing device 10. Camera 160 may be operatively positioned to record a view of the mobile device disposed in holder 110.

Camera 160 may be operatively coupled to non-transitory electronic storage device 170. For example, all of the data recorded by camera 160 may be stored in non-transitory electronic storage device 170. The data may be augmented, for example, with a date and time stamp, with information relating to test commands that were performed, with information related to a mobile device being tested, with information related to robotic testing device 10, and/or other information related to the recording. In some implementations, camera 160 may be a high-frame rate camera. Other types of cameras may also be used.

In some implementations, camera 160 may capture information relating to an interaction and may store that information in non-transitory electronic storage device 170 in a manner the same or similar to that described in co-pending U.S. patent application Ser. No. 13/692,154 (entitled "System and Method for Objectively Measuring User Experience of Touch Screen Devices," filed Dec. 3, 2012), which is hereby incorporated by reference in its entirety.

FIG. 5A illustrates a mobile device testing structure 500 of robotic testing device 10 that rotatably secures a mobile device 502 in a landscape orientation, according to an implementation of the invention. FIG. 5B illustrates a mobile device testing structure 500 of robotic testing device 10 that rotatably secures a mobile device 502 in a portrait orientation, according to an implementation of the invention.

Referring to both FIGS. 5A and 5B, in an implementation, mobile device testing structure 500 may rotate mobile device 502 being tested from a landscape orientation (as illustrated in FIG. 5A) to a portrait orientation (as illustrated in FIG. 5B). Mobile device testing structure 500 may therefore test mobile device 502 as it rotates the displayed screen from a landscape mode to a portrait mode and/or other functions related to rotating mobile device 502 from a landscape orientation to a portrait orientation.

In an implementation, carrier plate 130 may be mechanically coupled to holder 110, which secures mobile device 502 to mobile device testing structure 500 (and therefore to robotic testing device 10). Carrier plate 130 may also be mechanically coupled to an arm 504, which may support one or more implements 140 and a camera 160.

In an implementation, carrier plate 130 may be rotated in order to rotate mobile device 502 from a landscape orientation to a portrait orientation, causing mobile device 502 to change its screen modes from a landscape mode to a portrait mode, and vice versa. As would be appreciated, such rotation may include an approximately 90 degree clockwise or counter-clockwise rotation. The precise rotation required to effectuate the change in screen modes for mobile device 502 may be device-specific and may be measured by robotic testing device 10. When such a change is detected by camera 160, the rotational angle at which the detected change occurred may be recorded by the robotic testing device. For example, a first mobile device may change its screen from a landscape mode to a portrait mode when rotated 87 degrees while a second mobile device may do so when rotated 92 degrees.

In an implementation, reporting module 155 may generate a quantitative value (e.g., 92 degrees) based on the response of mobile device 502 and obtain a predetermined value or range of values (e.g., 88 degrees to 92 degrees) that is acceptable. Reporting module 155 may generate a validation report that includes information that indicates whether the response is acceptable. For example, reporting module 155 may compare the quantitative value with the acceptable value and indicate, in the validation report, whether the quantitative value is within the acceptable value or range of values. In another example, reporting module 155 may simply provide, in the validation report, the quantitative value and the predetermined value or range of values. Reporting module 155 may include other information and perform similar reporting functions with respect to other types of validations as described herein.

In an implementation, carrier plate 130 may be rigidly (although, in some implementations, removably) coupled to arm 504. In this implementation, as mobile device 502 is rotated or otherwise moved, implement(s) 104 and camera 160 may be moved as well, allowing implement(s) 104 to be moved to different portions of mobile device 502 without coordinate transformations. In other words, because mobile device testing structure 500 is moved as a single unit in these implementations, implement(s) 104 may interact with mobile device 502 as though mobile device testing structure 500 remains stationary.

In some implementations, carrier plate 130 may be moved independently of implement(s) 140 and/or camera 160. In these implementations, carrier plate 130 may be removably coupled from arm 504 or otherwise may not be rigidly coupled to implement(s) 140 and/or camera 160 as carrier plate 130 is moved. In these implementations, robotic testing device 10 (and/or a remote processing platform) may perform one or more coordinate transformation operations to map the movement of carrier plate 130 (and therefore mobile device 502) with respect to implement(s) 140 and/or camera 160. For example, if carrier plate 130 is pitched 30 degrees, the movement of implement(s) 140 to interact with mobile device 502 may be adjusted to account for the 30 degree pitch. Other types of movements in one or more degrees of freedom may be similarly accounted for as well. Furthermore, although not illustrated in FIG. 5A or FIG. 5B, mobile device 502 may be moved in other degrees of freedom as well, either simultaneously or separately from the rotation illustrated in these figures.

Exemplary Methods of Operation

Figure 6:
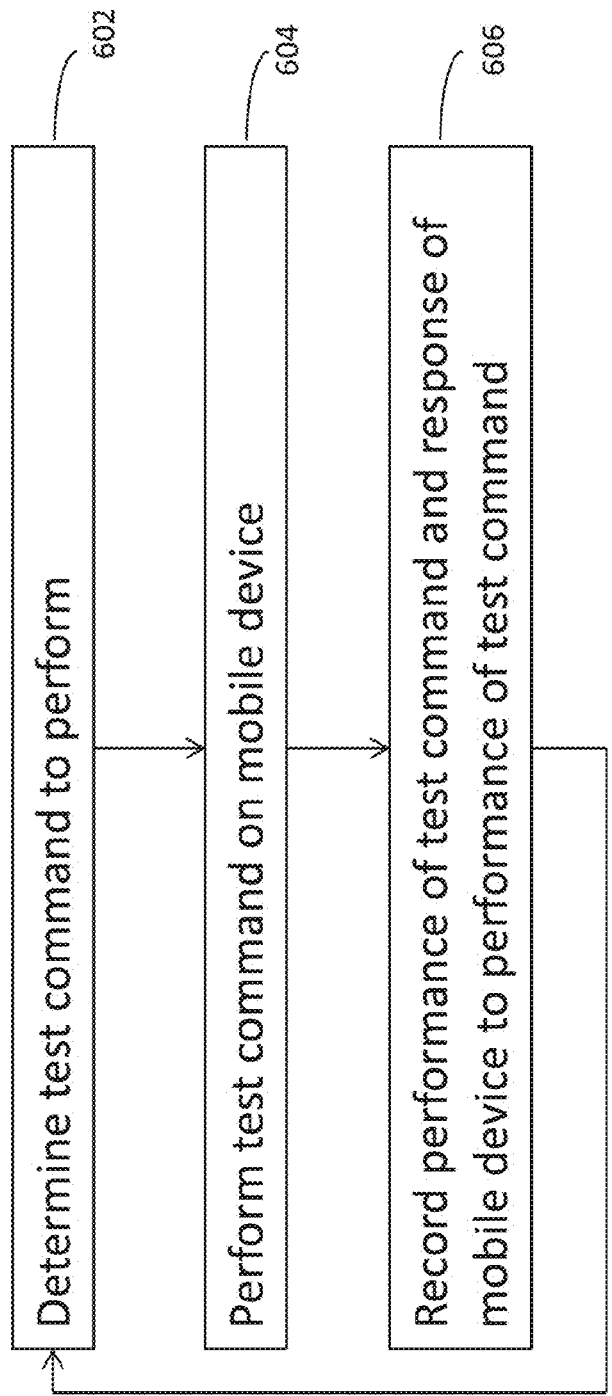
FIG. 6 illustrates a flowchart of an exemplary method of robotic testing of a mobile device, according to an aspect of the invention.
Figure 7:
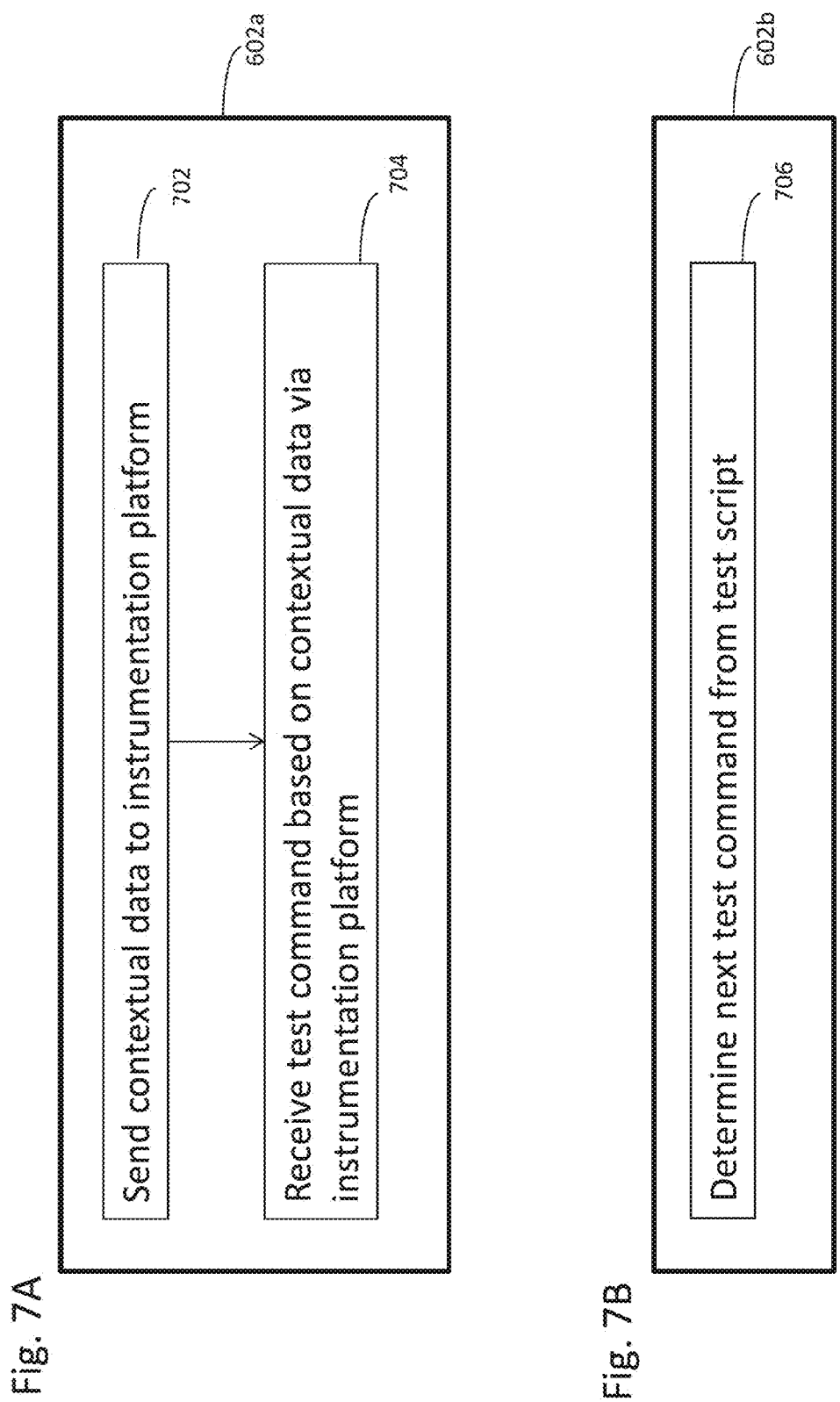
FIGS. 7A and 7B illustrate flow charts of an exemplary method of determining a next test command for an exemplary robotic testing device to perform, according to an aspect of the invention.

FIG. 6 illustrates a flowchart of an exemplary method of robotic testing of a mobile device, according to an aspect of the invention. FIGS. 7A and 7B illustrate flow charts of an exemplary method of determining a next test command for an exemplary robotic testing device to perform, according to an aspect of the invention.

The various processing operations depicted in the flowchart of FIG. 6 and other figures are described in greater detail herein. The described operations may be accomplished using some or all of the system components described in detail above and, in some implementations, various operations may be performed in different sequences. In other implementations, additional operations may be performed along with some or all of the operations shown in FIG. 6 and other figures, while some operations may be omitted. In yet other implementations, one or more operations may be performed simultaneously. Accordingly, the operations as illustrated (and described in greater detail below) are exemplary in nature and, as such, should not be viewed as limiting.

In an operation 602, robotic testing device 10 may determine which test command to perform. For example, robotic testing device 10 may determine which test command to perform based on features of the mobile device disposed in robotic testing device 10, based on type of validation requested, and/or based on other information related to testing the mobile device.

For example, as illustrated in FIG. 7A, robotic testing device 10 and/or the mobile device being tested may send contextual data to an instrumentation platform on another computing device (e.g., device 200) in an operation 702. In an operation 704, robotic testing device (e.g., testing module 151, and/or processor 150) may receive a test command to perform based on the contextual data sent to the instrumentation platform.

In another example, as illustrated in FIG. 7B, robotic testing device 10 may store test scripts, test commands, and/or other information related to determining a test command to perform on a mobile device. In an operation 706, robotic testing device 10 may determine a test command to perform on the mobile device.

Figure 8:
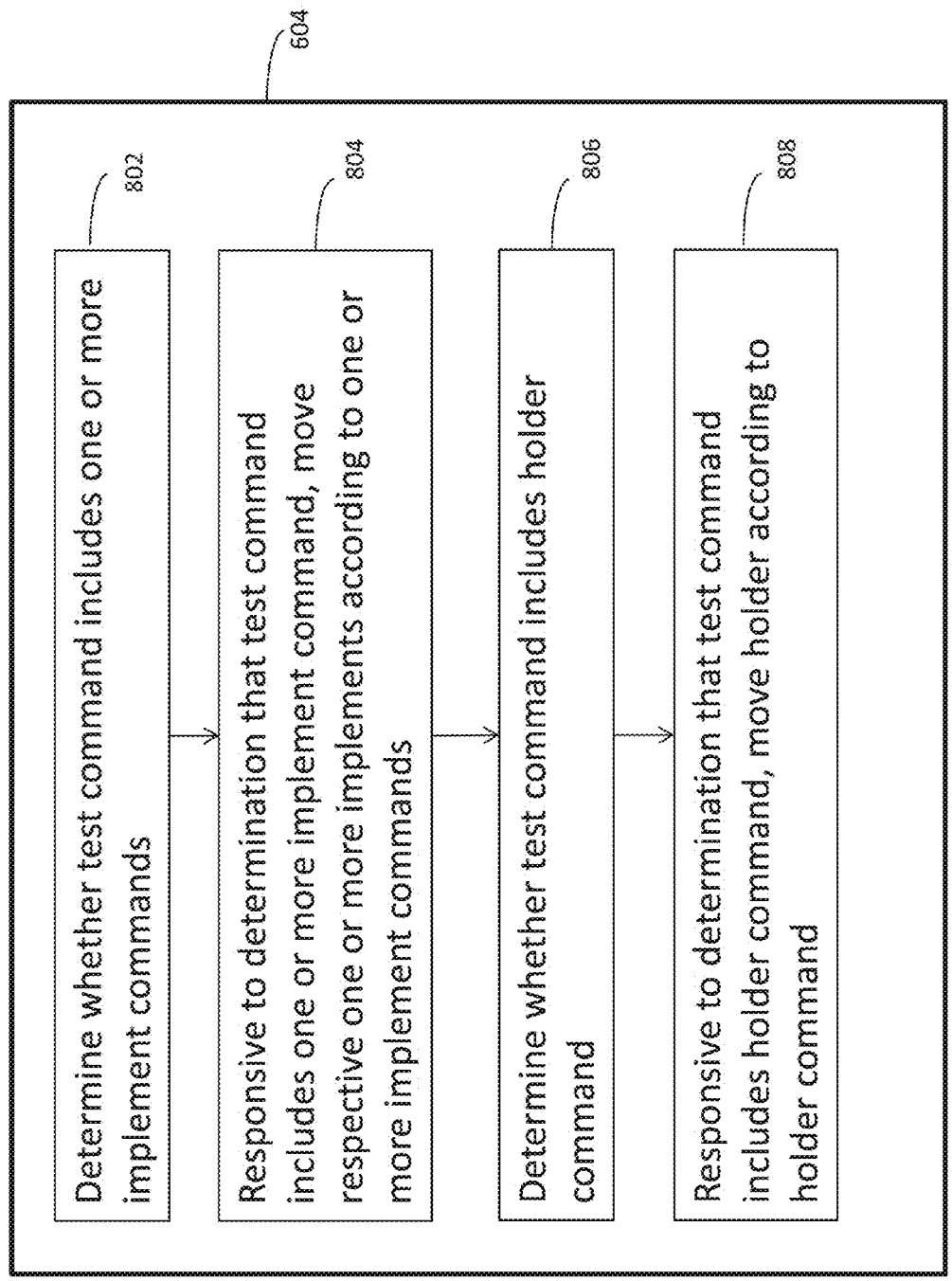
FIG. 8 illustrates a flow chart of an exemplary method of performing a test command by an exemplary robotic testing device, according to an aspect of the invention.

Returning to FIG. 6, in an operation 604, robotic testing device 10 may perform the test command on a mobile device. FIG. 8 illustrates a flow chart of an exemplary method of performing a test command by an exemplary robotic testing device, according to an aspect of the invention.

In an operation 802, robotic testing device 10 may determine whether the test command includes one or more implement commands.

In an operation 804, robotic testing device 10 may cause one or more robotic implements 140*a*, 140*b*, . . . , 140*n* specified in an implement command to move in a manner specified in the implement command, responsive to a determination that the test command comprises an implement command. For example, responsive to a determination that the test command comprises an implement command configured to cause robotic implement 140*a* to push a side button of the mobile device, robotic testing device 10 may cause robotic implement 140*a* to move so as to push the side button of the mobile device. Robotic testing device 10 (e.g., via camera 160 and/or other components) may record the performed button push and the response to the button push.

In another example, responsive to a determination that the test command comprises an implement command configured to cause robotic implement 140*a* to perform a swipe on a touch screen of the mobile device, robotic testing device 10 may cause robotic implement 140*a* to move so as to perform a swipe on a specified portion of the touch screen of the mobile device. Robotic testing device 10 (e.g., via camera 160 and/or other components) may record the performed swipe and the response to the swipe.

The implement commands that may be performed by robotic testing device 10 are not limited to the examples described herein.

In an operation 806, robotic testing device 10 may determine whether the test command includes one or more holder commands. In an operation 808, robotic testing device 10 may cause carrier plate 130 (and holder 110 mounted thereon) specified in an implement command to move in a manner specified in the holder command, responsive to a determination that the test command comprises a holder command.

For example, responsive to a determination that the test command comprises a holder command configured to cause holder 110 to move the mobile device such that it tilts at a certain speed, robotic testing device 10 may cause holder 110 to move the mobile device such that it tilts at the certain speed. Robotic testing device 10 (e.g., via camera 160 and/or other components) may record the performed tilt and the response to the tilt. Robotic testing device 10 may also request and/or record accelerometer data, gyroscope data, compass data, and/or other sensory data from the mobile device responsive to the tilt.

In another example, responsive to a determination that the test command comprises a holder command configured to cause holder 110 to shake the mobile device, robotic testing device 10 may cause holder 110 to move such that it shakes the mobile device. Robotic testing device 10 (e.g., via camera 160 and/or other components) may record the performed shake and the response to the shake. Robotic testing device 10 may also request and/or record accelerometer data, gyroscope data, compass data, and/or other sensory data from the mobile device responsive to the shake.

The holder commands that may be performed by robotic testing device 10 are not limited to the examples described herein.

Returning to FIG. 6, in an operation 606, robotic testing device 10 may record the performance of the test command on the mobile device and the output of the mobile device. For example, camera 160 may record the interaction between robotic testing device 10 and the mobile device and may facilitate storage of the recorded interaction in non-transitory electronic storage device 170. In another example, the mobile device may send data related to a response to the test command to robotic testing device 10 (e.g., for storage at non-transitory electronic storage device 170), may send the data to another device which may be operatively coupled to robotic testing device 10, and/or may otherwise handle data related to the performance of the test command.

Figure 9:
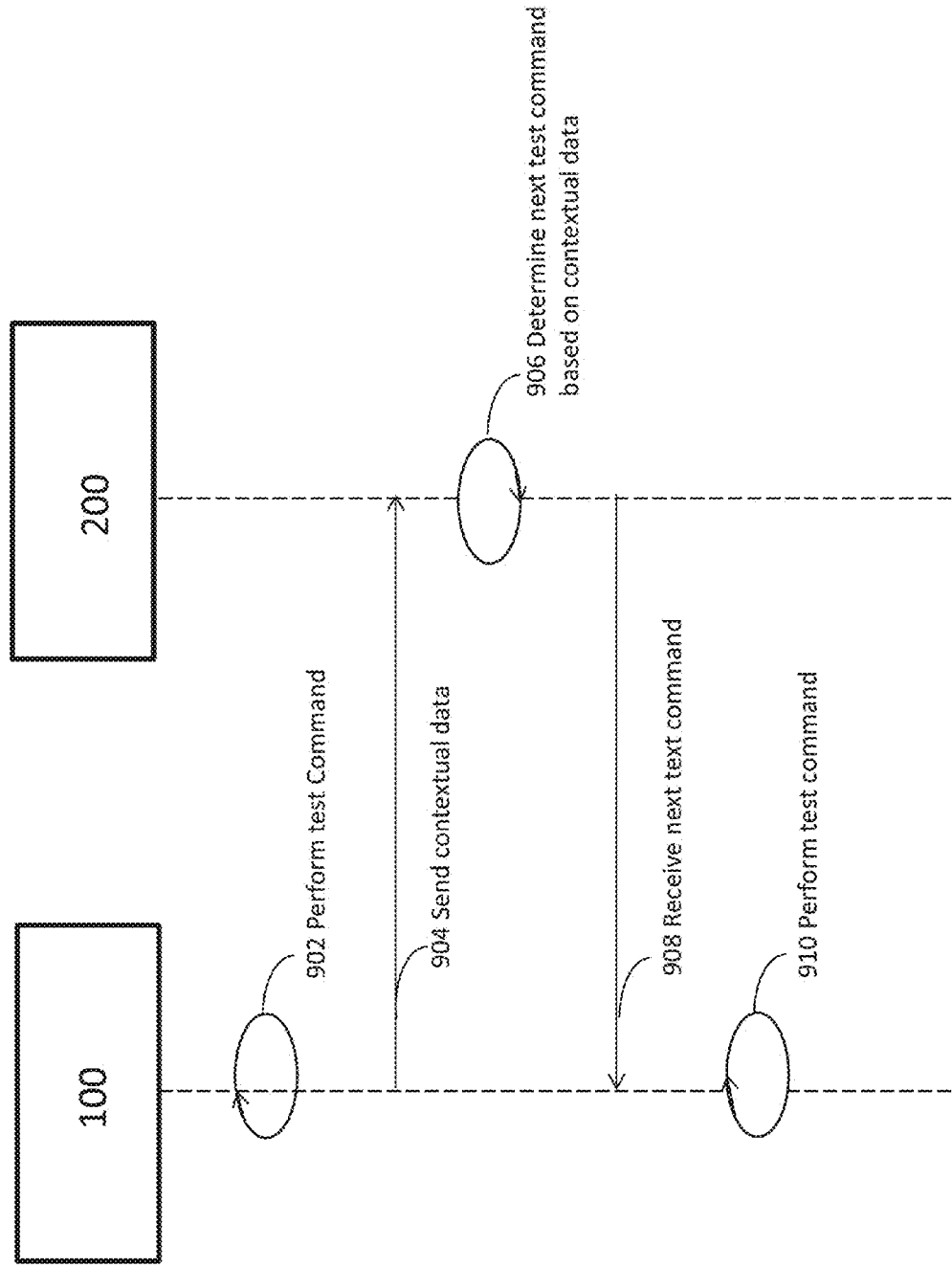
FIG. 9 illustrates a data flow diagram of an exemplary method of robotic testing of a mobile device, according to an aspect of the invention.

FIG. 9 illustrates a data flow diagram of an exemplary method of robotic testing of a mobile device, according to an aspect of the invention. In particular, FIG. 9 illustrates a data flow diagram of an exemplary method of robotic testing of a mobile device via an instrumentation platform, according to an aspect of the invention. Robotic testing device 10 being tested may be connected to the instrumentation platform via network 20. Robotic testing device 10 may send and receive information related to test commands being performed on the mobile device, recorded responses of the mobile device to the performed test commands, and/or other information related to testing the mobile device. In some implementations, the mobile device being tested may also be connected to the instrumentation platform. The mobile device may send and receive information related to the interactions of robotic testing device 10 with the mobile device, the response of the mobile device to the interaction, and/or other information related to testing the mobile device.

In an operation 902, robotic testing device 10 may perform a test command on a mobile device. Operation 902 may be the same as or similar to operation 604.

In an operation 904, robotic testing device 10 and/or the mobile device being tested may send contextual data related to the response of the mobile device to the instrumentation platform. The contextual data may comprise information related to the test command performed, a recorded response of the mobile device, and/or other data related to performing the test command.

In an operation 906, the instrumentation platform (e.g., running on device 200) may determine a next test command to be performed on the mobile device based on the received contextual data. The instrumentation platform may also determine the next test command based on characteristics of the mobile device, a type of validation associated with testing the mobile device, and/or other features of the test of the mobile device.

In an operation 908, robotic testing device 10 may receive the next test command from the instrumentation platform. Robotic testing device 10 may store the next test command in association with information related to the test of the mobile device.

In an operation 910, robotic testing device 10 may perform the test command. Operation 910 may be the same as or similar to operation 604.

Figure 10:
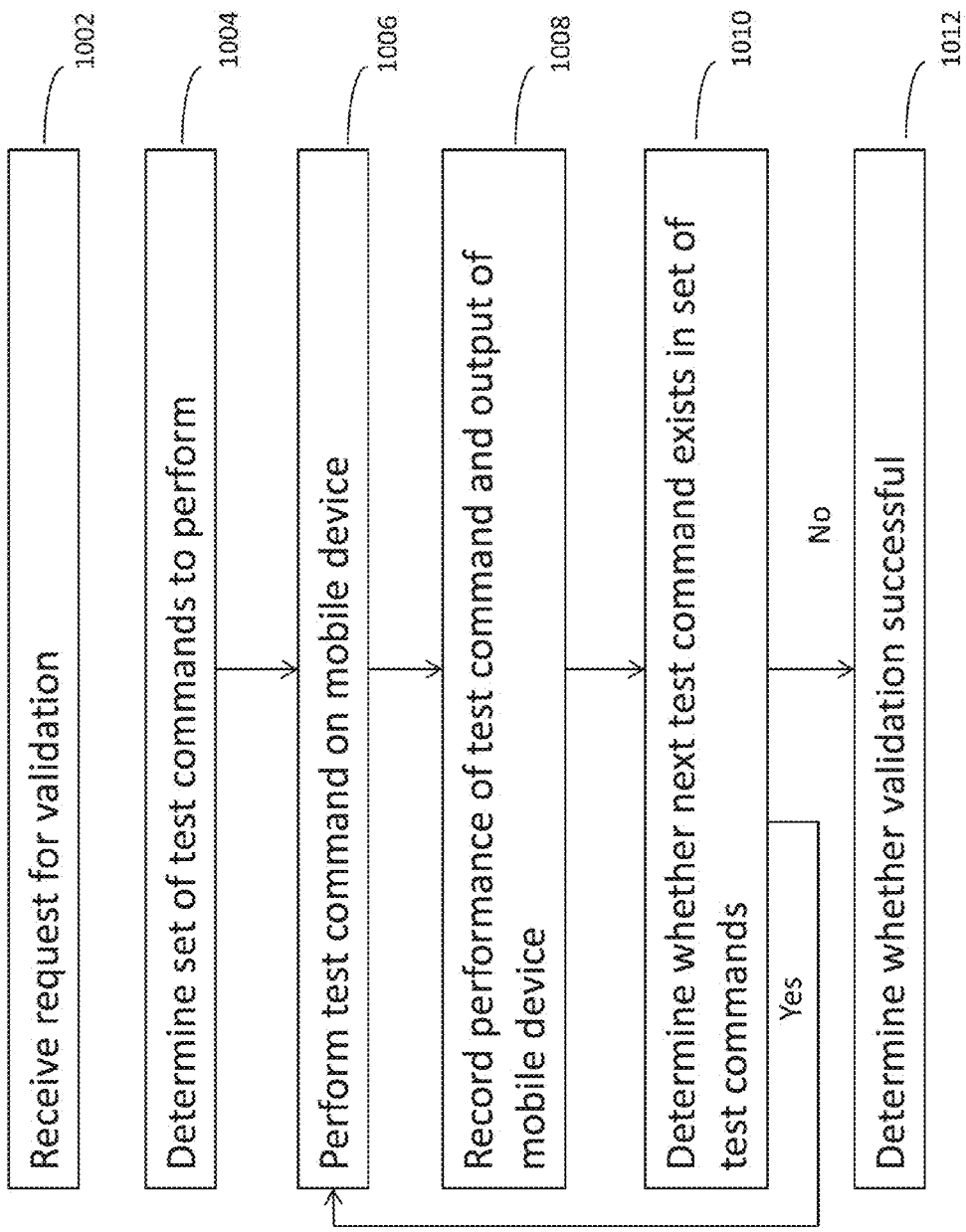
FIG. 10 illustrates a flow chart of an exemplary method of providing validation of a mobile device, according to an aspect of the invention.

FIG. 10 illustrates a flow chart of an exemplary method of providing validation of a mobile device, according to an aspect of the invention.

In an operation 1002, robotic testing device 10 and/or another computing device operatively coupled to robotic testing device 10 may receive a request for validation. The request for validation may comprise, for example, information related to a particular mobile device, a set of mobile devices with particular ids, a set of mobile devices with a particular operating system, a set of mobile devices with a particular set of hardware components, and/or other grouping of mobile devices. The request for validation may also comprise a type of validation. The type of validation may comprise validation for a test application running on a variety of mobile devices, for user experience of predetermined functionality to be run on the mobile device, for a mobile device operating on a variety of communication carriers, and/or another type of validation.

The request for validation may be stored in non-transitory electronic storage device 170. In some implementations, the request may be stored with an associated set of test commands, one or more test scripts, one or more mobile devices, and/or other information related to testing the grouping of mobile devices.

In an operation 1004, robotic testing device 10 may determine which test commands to perform on the mobile device. Operation 1004 may be the same as or similar to operation 504.

In an operation 1006, robotic testing device 10 may perform a test command of the set of test commands to perform on the mobile device. Operation 1006 may be the same as or similar to operation 606.

In an operation 1008, the performance of the test command and the response of the mobile device may be recorded by robotic test device 10. For example, camera 160 may record the interaction between robotic test device 10 and the mobile device as well as the response of the mobile device to the interaction. Robotic testing device 10 may capture the recording of the interaction and response and may analyze the captured data in a manner the same or similar to that described in co-pending U.S. patent application Ser. No. 13/692,154 (entitled "System and Method for Objectively Measuring User Experience of Touch Screen Devices," filed Dec. 3, 2012), incorporated by reference in its entirety above. As such, robotic testing device 10 may determine whether a test command was properly performed, and may record a corresponding response of the mobile device for later analysis.

In an operation 1010, robotic testing device 10 may determine whether the set of commands to perform for validation comprise a next test command that has not yet been performed. Responsive to a determination that a next test command exists in the set of test commands, the robotic testing device may perform the next test command in an operation 1006. Responsive to a determination that no other test commands exist, robotic testing device 10 may determine whether the validation was successful in an operation 1012.

In an operation 1012, robotic testing device 10 may provide a validation report related to the testing of the mobile device. Robotic testing device 10 and/or reporting module 154 may determine whether the validation of the mobile device was successful and may generate a validation report related to the validation. The validation report may be made available to the customer that requested validation. For example, the validation report may be made available via an online portal that the customer may access to request validation, provide customer preferences, and view validation reports. In another example, the validation report may be emailed, faxed, mailed, and/or otherwise provided to the customer.

Aspects and implementations described herein as including a particular feature, structure, or characteristic, but every aspect or implementation may not necessarily include the particular feature, structure, or characteristic. Further, when a particular feature, structure, or characteristic is described in connection with an aspect or implementation, it will be understood that such feature, structure, or characteristic may be included in connection with other aspects or implementations, whether or not explicitly described. Thus, various changes and modifications may be made to the provided description without departing from the scope or spirit of the invention. As such, the specification and drawings should be regarded as exemplary only, and the scope of the invention to be determined solely by the appended claims.

What is claimed is:

1. A method of robotic testing of a user device via a robotic testing device that comprises a holder, a motor, and a robotic implement, the method comprising:
   securing, by the holder, the user device to the robotic testing device;
   causing, by the robotic implement, an interaction with the user device at a first time;
   rotating, by the motor, the holder at the first time so as to rotate the user device at least about a horizontal axis; and
   recording a response of the user device to the interaction of the robotic implement and the rotation of the holder.

2. The method of claim 1, further comprising:
   causing, by a second robotic implement of the robotic testing device, an interaction with the user device at the first time,
   wherein recording the response comprises recording of the response of the user device to the interaction of the robotic implement, the interaction of the second robotic implement, and the rotation of the holder.

3. The method of claim 1, wherein rotating the holder comprises tilting the holder of the user device at the first time so as to emulate human movement of the user device.

4. The method of claim 3, further comprising:
   re-tilting, by the motor, the holder of the user device so as to emulate human movement of the user device.

5. The method of claim 1, further comprising:
   securing, by a second holder of the robotic testing device, a second user device to the robotic testing device;
   causing, by a second robotic implement of the robotic testing device, an interaction with the second user device; and
   recording a response of the second user device to the interaction of the second robotic implement.

6. The method of claim 1, further comprising:
   determining one or more test commands for validating the user device,
   wherein the interaction of the robotic implement with the user device at the first time is caused based on at least one of the one or more test commands, and
   wherein the holder is rotated at the first time based on at least one of the one or more test commands.

7. The method of claim 6, further comprising:
   receiving a request for validation of the user device, wherein the request comprises a type of validation to be performed,
   wherein the one or more test commands are determining based on the type of validation, wherein a given test command among the one or more test commands specifies and causes a given testing operation to be performed.

8. The method of claim 1, wherein the response of the user device to the interaction of the robotic implement and the rotation of the holder is recorded via a camera of the robotic testing device.

9. The method of claim 8, further comprising:
   analyzing the camera recording of the response of the user device to the interaction of the robotic implement and the rotation of the holder;
   determining contextual data of the user device based on the analysis of the camera recording of the response of the user device to the interaction of the robotic implement and the rotation of the holder;
   sending the contextual data of the user device to a remote instrumentation platform; and
   receiving a test command for validating the user device from the remote instrumentation platform responsive to sending the contextual data.

10. The method of claim 1, wherein the rotation of the holder causes the robotic implement to be rotated at least about the horizontal axis.

11. A system for robotic testing of a user device through a robotic testing device, comprising:
    a holder configured to secure the user device to the robotic testing device;
    a motor coupled to the holder and configured to move the holder so as to emulate human movement;
    a robotic implement configured to move along a horizontal, a vertical, and/or a transverse axis to interact with the user device; and
    a physical processor programmed with computer readable instructions to execute computer program instructions which, when executed, cause the physical processor to:
      cause the robotic implement to interact with the user device at a first time; and
      rotate, via the motor, the holder at the first time so as to rotate the user device at least about a horizontal axis; and
      record a response of the user device to the interaction of the robotic implement and the rotation of the holder.

12. The system of claim 11, further comprising a second robotic implement configured to move along a horizontal, a vertical, and/or a transverse axis to interact with the user device, wherein the physical processor is further caused to:
    cause the second robotic implement to interact with the user device at the first time,
    wherein recording the response comprises recording of the response of the user device to the interaction of the robotic implement, the interaction of the second robotic implement, and the rotation of the holder.

13. The system of claim 11, wherein rotating the holder comprises tilting the holder of the user device at the first time so as to emulate human movement of the user device.

14. The system of claim 13, wherein the physical processor is further caused to:
    re-tilt, via the motor, the holder of the user device so as to emulate human movement of the user device.

15. The system of claim 11, wherein the physical processor is further caused to:
    determine one or more test commands for validating the user device,
    wherein the interaction of the robotic implement with the user device at the first time is caused based on at least one of the one or more test commands, and
    wherein the holder is rotated at the first time based on at least one of the one or more test commands.

16. The system of claim 11, further comprising a camera operatively coupled to the physical processor, wherein the camera is positioned in the system so as to record one or more responses of the user device to robotic testing, and wherein the response of the user device to the interaction of the robotic implement and the rotation of the holder is recorded via the camera.

17. The system of claim 16, further comprising:
    a non-transitory electronic storage device configured to store data captured from the camera.

18. The system of claim 11, wherein the robotic implement is removably coupled to the robotic testing device by a set of hardware ports, such that the robotic implement is removable from the robotic testing device and replaceable with another robotic implement configured to interact with the user device.

19. The system of claim 11, wherein the robotic implement is physically connected to the holder such that the rotation of the holder causes the robotic implement to be rotated at least about the horizontal axis.

* * * * *